(12) United States Patent
Faizian et al.

(10) Patent No.: US 11,868,261 B2
(45) Date of Patent: Jan. 9, 2024

(54) PREDICTION OF BUFFER POOL SIZE FOR TRANSACTION PROCESSING WORKLOADS

(71) Applicant: Oracle International Corporation, Redwood Shores, CA (US)

(72) Inventors: Peyman Faizian, Thousand Oaks, CA (US); Mayur Bency, Redwood City, CA (US); Onur Kocberber, Thalwil (CH); Seema Sundara, Nashua, NH (US); Nipun Agarwal, Saratoga, CA (US)

(73) Assignee: Oracle International Corporation, Redwood Shores, CA (US)

( * ) Notice: Subject to any disclaimer, the term of this patent is extended or adjusted under 35 U.S.C. 154(b) by 115 days.

(21) Appl. No.: 17/381,072

(22) Filed: Jul. 20, 2021

(65) Prior Publication Data

US 2023/0022884 A1 Jan. 26, 2023

(51) Int. Cl.
*G06F 16/2455* (2019.01)
*G06F 12/0842* (2016.01)

(52) U.S. Cl.
CPC .... *G06F 12/0842* (2013.01); *G06F 16/24552* (2019.01); *G06F 2212/6022* (2013.01)

(58) Field of Classification Search
CPC ............ G06F 12/0842; G06F 16/2455; G06F 2212/6022
(Continued)

(56) References Cited

U.S. PATENT DOCUMENTS 7,594,234 B1 9/2009 Dice
9,262,233 B1 2/2016 Reed et al.
(Continued)

FOREIGN PATENT DOCUMENTS

CN 103729242 4/2014
CN 104932933 11/2018
(Continued)

OTHER PUBLICATIONS

Ha et al., "Reactive Spin-locks: A Self-tuning Approach," 8th International Symposium on Parallel Architectures, Algorithms and Networks (ISPAN'05), 2005, 6 pages.
(Continued)

*Primary Examiner* — Robert W Beausoliel, Jr.
*Assistant Examiner* — Lauren Zannah Ganger
(74) *Attorney, Agent, or Firm* — Hickman Becker Bingham Ledesma LLP

(57) ABSTRACT

Techniques are described herein for prediction of an buffer pool size (BPS). Before performing BPS prediction, gathered data are used to determine whether a target workload is in a steady state. Historical utilization data gathered while the workload is in a steady state are used to predict object-specific BPS components for database objects, accessed by the target workload, that are identified for BPS analysis based on shares of the total disk I/O requests, for the workload, that are attributed to the respective objects. Preference of analysis is given to objects that are associated with larger shares of disk I/O activity. An object-specific BPS component is determined based on a coverage function that returns a percentage of the database object size (on disk) that should be available in the buffer pool for that database object. The percentage is determined using either a heuristic-based or a machine learning-based approach.

18 Claims, 11 Drawing Sheets

(58) Field of Classification Search
USPC .......................................................... 707/803
See application file for complete search history.

(56) References Cited

U.S. PATENT DOCUMENTS

| | | | |
|---|---|---|---|
| 10,691,658 B2 | 6/2020 | Kameswaran | |
| 2005/0114621 A1* | 5/2005 | Lahiri ................... | G06F 12/023 711/170 |
| 2006/0074970 A1* | 4/2006 | Narayanan .......... | G06F 11/3476 707/999.102 |
| 2009/0144746 A1 | 6/2009 | Song et al. | |
| 2010/0005468 A1 | 1/2010 | Chang et al. | |
| 2011/0035369 A1* | 2/2011 | Halasipuram ..... | G06F 16/24549 707/720 |
| 2020/0349067 A1 | 11/2020 | Syamala | |
| 2021/0132998 A1 | 5/2021 | Uchida et al. | |
| 2022/0107933 A1 | 4/2022 | Kocberber et al. | |

FOREIGN PATENT DOCUMENTS

| | | |
|---|---|---|
| CN | 109086124 | 12/2018 |
| KR | 20180066387 | 6/2018 |

OTHER PUBLICATIONS

Current Claims in Application No. PCT/US2022/030119, dated Aug. 2022, 4 pages.
The International Searching Authority, "Search Report" in Application No. PCT/US2021/047971, dated Dec. 8, 2021, 12 pages.
MySQL 8.0 Reference Manual, "15.8.8 Configuring Spin Lock Polling", https://dev.mysql.com/doc/refman/8.0/en/innodb-performance-spin_lock_polling.html, dated Oct. 2020, 2 pages.
Current Claims in Application No. PCT/US2021/047971, dated Dec. 2021, 8 pages.
U.S. Appl. No. 17/060,999, filed Oct. 1, 2020.
Van Aken, D., et al., "Automatic database management system tuning through large-scale machine learning," in SIGMOD '17, May 14, 2017, 16pgs.
Tan, Jian, et al., "iBTune: Individualized Buffer Tuning for Large-scale Cloud Databases", in Proceedings of the VLDB Endowment, vol. 12, No. 10, DOI: https://doi.org/10.14778/3339490.3339503, 2019, 14pgs.
Oracle, "The Information_Schemainnodb_Buffer_Pool_Stats Table," https://dev.mysql.com/doc/refman/8.0/en/information-schema-innodb-buffer-pool-stats-table.html, first accessed May 5, 2021, 5pgs.
Oracle, "15.5.1 Buffer Pool," MySQL 8.0 Ref Manual, https://dev.mysql.com/doc/refman/8.0/en/innodb-buffer-pool.html, 2021, 7pgs.
Difallah, D., et al., "OLTP-Bench: An extensible testbed for benchmarking relational," in Proceedings of the VLDB Endowment, vol. 7, No. 4, 2013, 12pgs.
"Sysbench," [Online]. Available: https://github.com/akopytov/sysbench, [Accessed Dec. 31, 2020], 9pgs.
Zhang, Ji et al. "An End-to-End Automatic Cloud Database Tuning System Using Deep Reinforcement Learning", Proceedings of the 2019 International Conference on Management of Data, 2019.
S. Gharghabi et al., "Matrix Profile VIII: Domain Agnostic Online Semantic Segmentation at Superhuman Performance Levels", 2017 IEEE International Conference On Data Mining (ICDM), New Orleans, LA, 2017, pp. 117-126.
Oracle Corporation, "Configuring Spin Lock Polling", available: https://dev.mysql.com/doc/refman/8.0/en/innodb-performance-spin_lock_polling.html, 2021.
MySQL on ARM, "Understanding InnoDB rw-lock stats", available: https://mysqlonarm.github.io/Understanding-InnoDB-rwlock-stats/, Apr. 14, 2020.
Keogh, Eamonn et al., "Hot Sax: Efficiently Finding the Most Unusual Time Series Subsequence", Fifth IEEE International Conference on Data Mining (ICDM'05), Houston, TX, 2005.
Harizopoulos, Stavros et al., "OLTP Through the Looking Glass, and What We Found There", SIGMOD 2008.
Falsafi, Babak et al., "Unlocking Energy", 2016 USENIX Annual Technical Conference (USENIX ATC 16).
"Spin Loop Hint, x86 Instruction Set Reference", available: https://c9x.me/x86/html/file_module_x86_id_232.html, page accessed on Sep. 30, 2021.
"Enabling Automatic Configuration for a Dedicated MySQL Server", available: https://dev.mysql.com/doc/refman/8.0/en/innodb-dedicated-server.html, 2021.
Kravtchuk, Dimitri, "MySQL Performance: Demystified Tuning & Best Practices", available: http://dimitrik.free.fr/Presentations/MySQL_Perf-Tuning-OOW2015-dim.pdf, 2015.
Kraus, Alois, "Why Skylake CPUs Are Sometimes 50% Slower—How Intel Has Broken Existing Code", available: https://aloiskraus.wordpress.com/2018/06/16/why-skylakex-cpus-are-sometimes-50-slower-how-intel-has- broken-existing-code/, 2018.
Anderson, Thomas E., "The Performance of Spin Lock Alternatives for Shared-Money Multiprocessors", IEEE Transactions on Parallel and Distributed Systems, vol. 1, No. 1, Jan. 1990, pp. 6-16.
Aminikhanghahi, Samaneh et al., "A survey of methods for time series change point detection. Knowledge and Information Systems", 2016, pp. 1-29.
Kocberber, U.S. Appl. No. 17/060,999, filed Oct. 1, 2020, Non-Final Rejection, dated Jan. 5, 2022.

* cited by examiner

| 430 | 00:30 | 01:00 | 01:30 | 02:00 | 02:30 | 03:00 | 03:30 | 04:00 | 04:30 | 05:00 | 05:30 | 06:00 | 06:30 | 07:00 | 07:30 | 08:00 | 08:30 | 09:00 | 09:30 | 10:00 |
|---|---|---|---|---|---|---|---|---|---|---|---|---|---|---|---|---|---|---|---|---|
| AVG. QUERIES PER SEC. | 1 | 3 | 2 | 5 | 6 | 3 | 5 | 6 | 7 | 10 | 7 | 8 | 7 | 9 | 10 | 11 | 10 | 9 | 7 | 10 |
| AVG. BP HIT RATE | 0.05 | 0.10 | 0.20 | 0.50 | 0.40 | 0.60 | 0.70 | 0.75 | 0.65 | 0.70 | 0.75 | 0.80 | 0.75 | 0.65 | 0.75 | 0.70 | 0.80 | 0.75 | 0.80 | 0.75 |
| STEADY STATE FLAG | 0/0 | 0/0 | 0/0 | 0/0 | 0/0 | 0/0 | 0/0 | 0/0 | 0/0 | 0/0 | 0/0 | 0/0 | 0/0 | 0/0 | 0/0 | 0/0 | 0/0 | 0/1 | 0/1 | 0/1 |

FIG. 4C

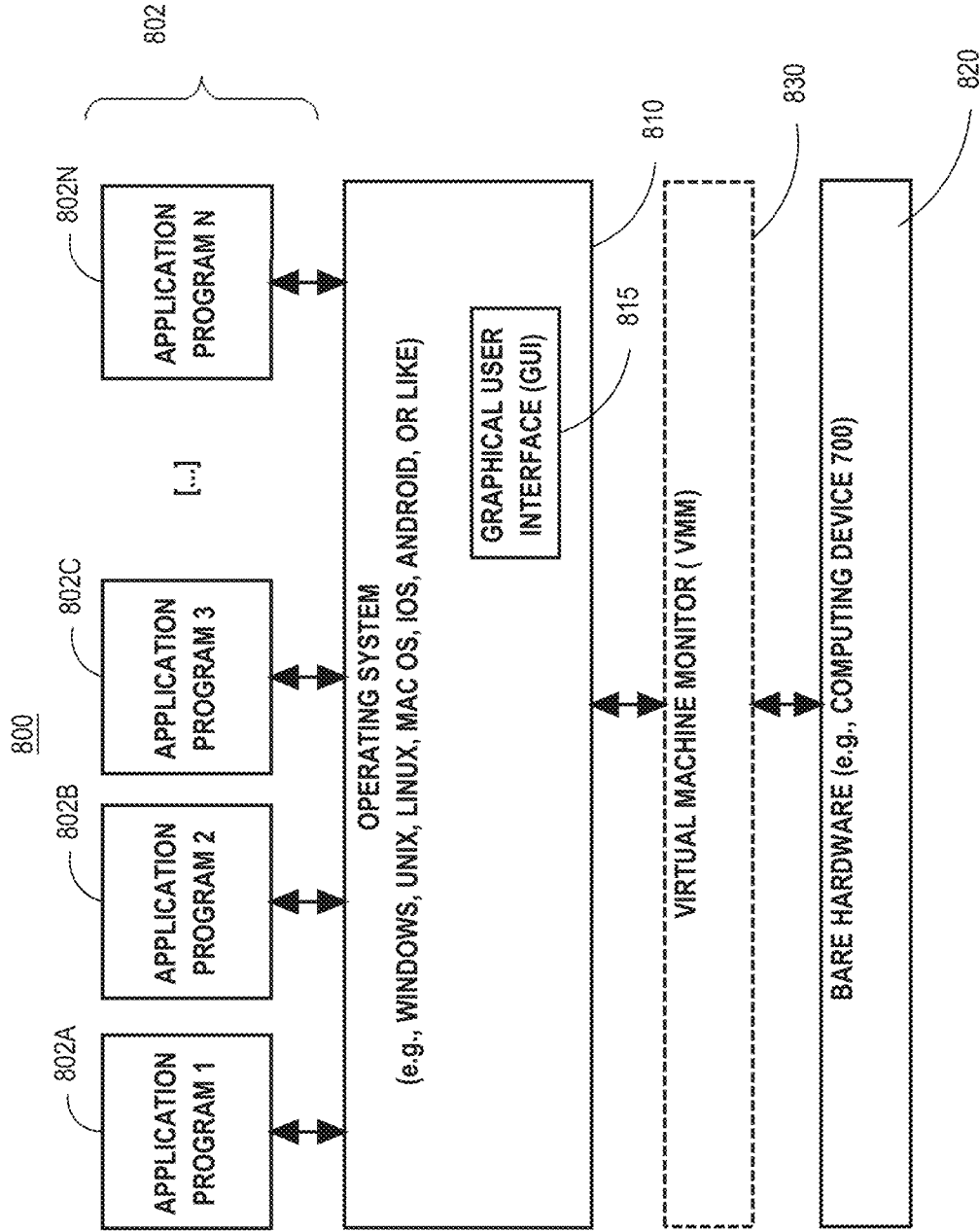

PREDICTION OF BUFFER POOL SIZE FOR TRANSACTION PROCESSING WORKLOADS

CROSS-REFERENCE TO RELATED APPLICATIONS

This application is related to U.S. patent application Ser. No. 17/060,999, titled "Efficient Adjustment of Spin-Locking Parameter Values", filed Oct. 1, 2020, the entire contents of which is hereby incorporated by reference as if fully set forth herein.

FIELD OF THE INVENTION

Techniques described herein relate to memory allocation for database management systems, and, more specifically, to optimizing the sizes of buffer pools configured to cache data for database workloads.

BACKGROUND

Contemporary database management systems (DBMSs) use memory resources (e.g., DRAM) to improve query performance. Although DBMS memory utilization might take different shapes and forms (such as a heap, a cache, a buffer, etc.), memory resources are primarily used to minimize disk I/O, since accessing data on disk is orders of magnitude slower than accessing data that resides in memory.

A buffer pool is an area of memory where user and application data are cached, where copies of accessed data pages are stored in the buffer pool memory as they are retrieved from disk. When a database object is queried, the DBMS initially checks the buffer pool to determine if the required data pages are already resident in memory. If not, the required data pages are fetched from disk into the buffer pool. In the event that there is not sufficient free space in the buffer pool for the fetched data pages, one or more resident pages are evicted to make space for the fetched data. Data eviction is based on a predetermined eviction policy such as least-recently used (LRU). Eviction of data previously residing in memory generally results in additional costly disk I/O operations to access the evicted data, when needed.

Many times, the cost of disk I/O operations motivates allocation of larger buffer pool space in order to increase DBMS performance. Ideally, the buffer pool allocated for a particular database workload is large enough to hold all of the data required by the workload. However, memory is often a scarce system resource, and an overprovisioned buffer pool space is also not desirable. Furthermore, in cloud computing systems, clients pay for the amount of memory that is to be allocated for their workloads, and it is important to know how much memory should be included in cloud computing contracts. Therefore, selecting the optimal size for the buffer pool in memory is an important knob to tune in order to achieve desirable DBMS performance while efficiently utilizing hardware resources.

The size of a buffer pool allocated for a particular workload may be chosen by a database administrator (DBA). Generally, a DBA bases buffer pool size (BPS) on a best guess based on optimizing one or more system metrics (e.g., a throughput metric, disk I/O operations, etc.). If, after an initial BPS is set for a workload, optimization goals for the workload are not met, then the DBA generally starts an informed trial and error approach in which the DBA monitors the metrics of interests and adjusts the BPS until the desired outcome is achieved.

Although this manual approach has seemingly served the industry well for many years, there are at least two problems with the approach that either result in sub-optimal buffer pool size and/or incur unnecessary costs and overhead. Specifically, (1) manually tuning the BPS is a time-consuming and ad-hoc process, (2) the BPS needs to change as the workload changes, and (3) manual BPS tuning is not always an option.

Manually tuning the BPS is a time-consuming and ad-hoc process. Given that a buffer pool is a cache of frequently-accessed data from a dataset, the total dataset size is not always a reliable indicator of the optimal size of the buffer pool. Therefore, even the most experienced and skillful DBAs generally require multiple trials of buffer pool sizes to identify an optimal buffer pool size. In the meantime, while the DBA runs the experiments with different buffer pool sizes, the workload operates with a sub-optimal BPS, which reduces the efficiency of running the workload. Furthermore, workload efficiency generally takes a hit (e.g., performance degradation and potential service interruptions) every time the BPS is changed, which increases the cost of experimentation-based techniques.

Furthermore, manual adjustment of BPS does not always result in an optimal size for the buffer pool. For example, at least one study shows that DBAs often choose the BPS for a workload from a small and fixed number of recommended values, and that these manual configurations can generally be improved by at least 17%. Therefore, the manual buffer pool adjustment process is neither efficient nor effective.

The BPS used for a workload needs to change as the workload changes. Specifically, as workloads evolve, their buffer pool requirements also change. For example, the database data over which a workload runs can grow or shrink depending on the nature of transactions being applied to the data, and such size fluctuations may affect the optimal BPS. Even through the course of a standard business day, workload access patterns (i.e., the distribution of data rows accessed by workload queries) and users on the system may vary, which might change the buffer pool requirements for the workload throughout the day. In addition, particular jobs (e.g., Online Analytical Processing (OLAP) queries) may run during particular hours of the business day, which may change buffer pool allocation requirements during those times. The manual approach for tuning the BPS lacks elasticity and fails to allow adaptation to dynamic workload changes.

Also, manual BPS tuning is not always an option. For example, not all companies employ DBAs to manage their DBMSs. Further, the required experimentation may render manual BPS tuning infeasible, e.g., when dealing with a large number of individual database instances.

As an alternative to manual BPS tuning, there is a technique to automatically determine an optimal BPS for a given workload based on automatic performance of a set of experiments using different BPSs for the workload. This technique automatically identifies an optimal BPS based on optimization of one or more system metrics. However, like DBA manual BPS tuning, this automatic technique will most likely cause the workload to run using at least one sub-optimal BPS, which decreases the efficiency of the workload, and workload efficiency generally takes a hit every time the BPS is changed.

As such, it would be beneficial to automatically identify an optimal BPS for a given workload without requiring BPS experimentation.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Further, it should not be assumed that any of the approaches described in this section are well-understood, routine, or conventional merely by virtue of their inclusion in this section.

BRIEF DESCRIPTION OF THE DRAWINGS

In the drawings:

FIGS. 4A-4C depict example steady state historical data and aggregated steady state metrics.

FIG. 8 is a block diagram of a basic software system that may be employed for controlling the operation of a computer system.

DETAILED DESCRIPTION

Figure 1:
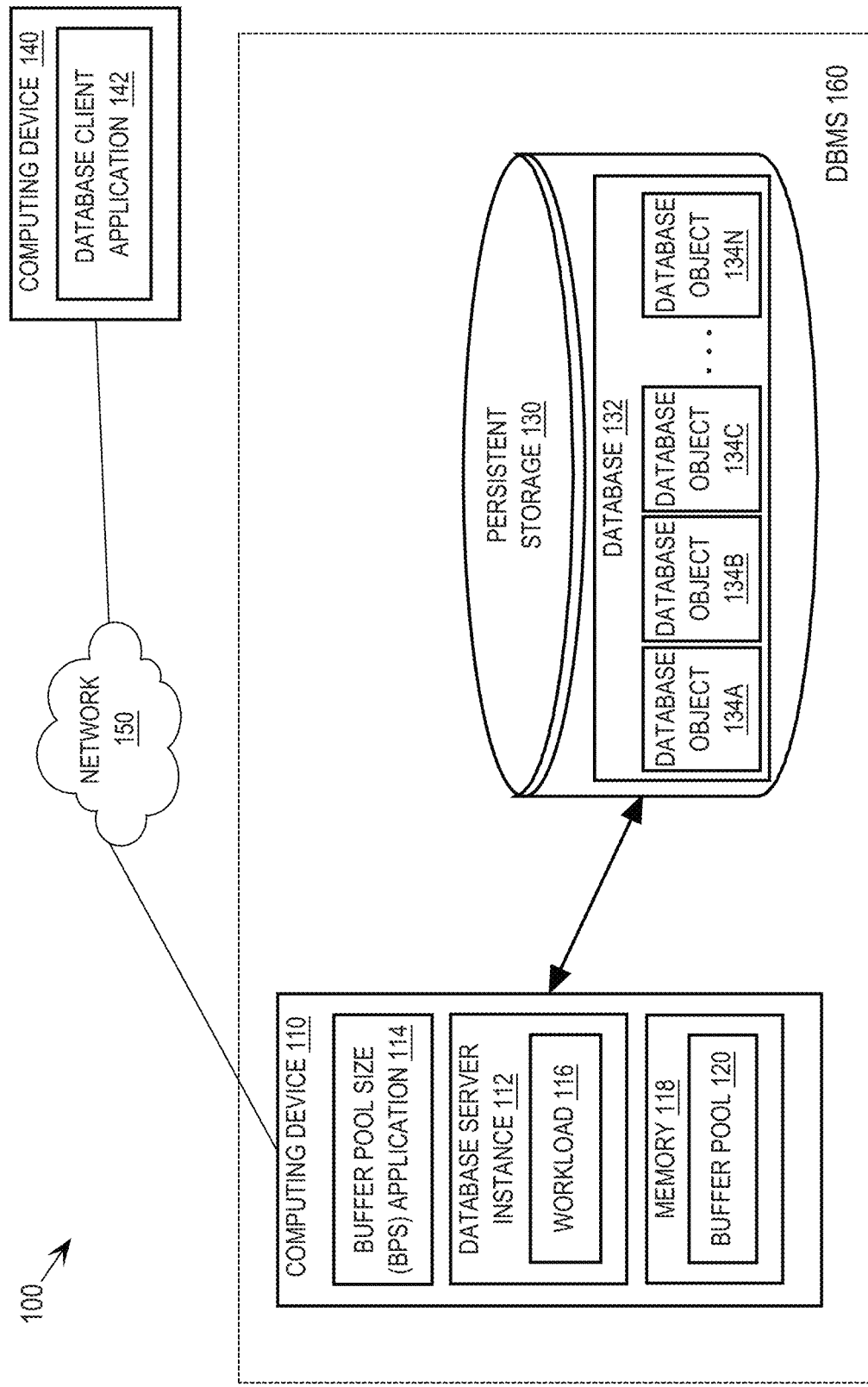
FIG. 1 depicts a block diagram of an example database management system.

In the following description, for the purposes of explanation, numerous specific details are set forth in order to provide a thorough understanding of techniques described herein. It will be apparent, however, that techniques described herein may be practiced without these specific details. In other instances, well-known structures and devices are shown in block diagram form in order to avoid unnecessarily obscuring techniques described herein.

1. General Overview

Techniques are described herein for prediction of an optimal buffer pool size for a target database workload based on analysis of historical utilization data gathered for the workload. These techniques are based on the insight that the required buffer pool space for a given database object is a function of the database object size and the access pattern for the object. According to some embodiments, a BPS prediction tool passively gathers one or more metrics (such as query throughput, buffer pool hit rate, a number of disk I/O requests, etc.) for the database workload. BPS prediction is based on object-specific analysis of the gathered database metrics, and not on experimentation with different buffer pool sizes.

Before performing BPS prediction, the BPS prediction tool uses gathered data to determine whether the target workload is running in a steady state. The tool then uses data, gathered while the target workload is known to be operating in a steady state, to predict an optimal BPS for the workload. Specifically, the BPS prediction tool identifies, for optimal BPS prediction analysis, one or more of the database objects being accessed by a target workload, and predicts object-specific buffer pool size components for the one or more identified database objects.

A database object is identified for optimal BPS prediction analysis based on a share of the total disk I/O requests, for the workload, that are attributed to the object. The described techniques prioritize optimal BPS prediction analysis for database objects that are associated with relatively large shares of disk I/O activity, which indicates that these objects are underrepresented in the buffer pool.

An object-specific buffer pool size component is determined for an identified database object based on a coverage function that returns a percentage of the database object size (on disk) that should be available in the buffer pool for that database object. The percentage is determined using either a heuristic-based approach or a machine learning-based approach.

BPS prediction techniques described herein use low-cost workload monitoring instead of BPS experimentation to identify an optimal BPS prediction for a target workload. As such, techniques avoid the system availability and performance issues caused by changing the BPS for experimentation, as well as the reduced workload efficiency during experiments that cause the workload to run at a sub-optimal BPS. Further, BPS prediction techniques may be used to monitor and adapt to inherent workload changes without the need for DBA intervention, providing accessibility, scalability, and elasticity of the BPS tuning process no matter the complexity of the set of workloads being tuned.

Buffer pool hit rate is the rate at which data request are satisfied based on data in the buffer pool without requiring a physical disk I/O. Accordingly, for a given workload running at a less-than-optimal buffer pool hit rate, implementation of the predicted optimal BPS produced by techniques described herein allows the workload to approach a 100% buffer pool hit rate, which increases the efficiency of running the workload. Because disk I/O is orders of magnitude more expensive than logical I/O (served by the in-memory buffer pool), it follows that a buffer pool's hit rate is a very important measurement of buffer pool effectiveness, and higher hit rates correspond to better expected performance of the database system. Thus, BPS optimization aims to achieve maximum buffer pool hit rate, without causing over-provisioning of the buffer pool, by a) identifying database objects that cause the bulk of disk I/O requests for the target workload and b) estimating additional buffer pool space needed to increase the representation of the identified database objects in the buffer pool such that the amount of disk I/O requests for the workload are minimized. Not only does the hit rate improve for the workload, but the throughput also improves such that the computing power required to run the workload is reduced. In one case study, implementation of the recommended buffer pool size for a particular database system increased the throughput of the system by 300%.

2. Example Computing System for Prediction of Buffer Pool Size

Techniques for prediction of buffer pool sizes are described herein in the context of FIG. 1, but are not limited thereto. Specifically, FIG. 1 depicts an example network arrangement 100, which includes a DBMS 160 comprising a computing device 110 running a database server instance ("instance") 112. DBMS 160 further comprises a database 132 in persistent storage 130. Database 132 includes database objects 134A-N, each of which may variously be any kind of database object including a table, a table column, a tablespace, a materialized view, an index, etc. Instance 112 runs a workload 116, which comprises a collection of queries to execute, such as queries of one or more database applications and/or user-initiated queries. Example network arrangement 100 further comprises a computing device 140 communicatively coupled to computing device 110 via a network 150. Computing device 140 runs a database client application 142. Computing devices 110 and 140 may be any type of computing device, as described in further detail below.

Computing device 110 further includes memory 118 (e.g., DRAM), part of which is allocated to a buffer pool 120 for workload 116. Specifically, buffer pool 120 caches data from database objects (such as database objects 134A-N) that are accessed by workload 116.

Computing device 110 also runs a BPS application 114, which is depicted as a stand-alone application that communicates with instance 112 to retrieve needed data. However, BPS application 114 may be implemented in any way, including as a stand-alone application running on client computing device 140, or as part of instance 112 on computing device 110. BPS application 114 is a non-limiting example application that performs prediction of BPS for a target workload, such as workload 116.

Figure 2:
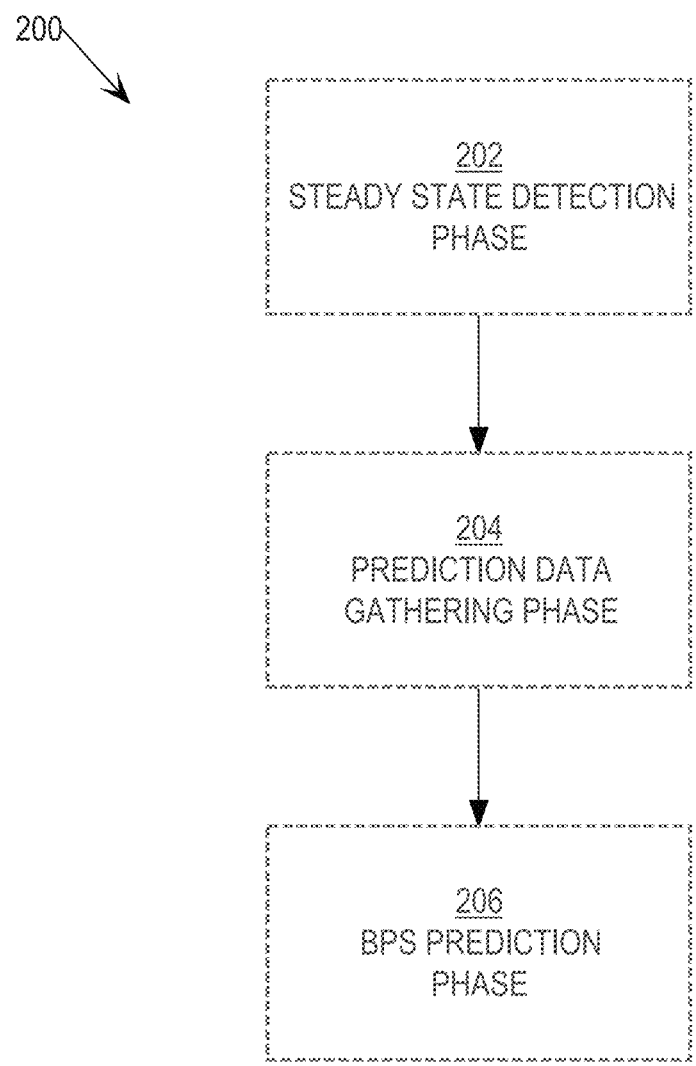
FIG. 2 depicts a flowchart for three phases of a BPS prediction technique.

According to some embodiments, BPS application 114 performs prediction of BPS using a three-phase system depicted by example flowchart 200 of FIG. 2. Specifically, BPS application 114 first enters a steady state detection phase 202 during which it is determined whether a target workload is in a steady state. After determining that the target workload is in a steady state, BPS application 114 enters a prediction data gathering phase 204 during which data are collected for the target workload. Once sufficient data are gathered during phase 204, BPS application 114 enters a BPS prediction phase 206, during which the gathered data are used to generate a predicted optimal BPS.

3. Initiation and Configuration of Buffer Pool Size Prediction

BPS application 114 may initiate prediction of an optimal BPS for a target workload in any way. For example, BPS application 114 receives a request (e.g., from database client application 142 running on computing device 140) to predict an optimal BPS for workload 116. According to some embodiments, the request includes one or more user preference parameters that BPS application 114 uses to configure the prediction of optimal BPS for workload 116. The included user preference parameters may be for any of phases 202-206. Further, user preference parameters may be applicable to multiple phases.

For example, user preference parameters for steady state detection phase 202 may include: one or more steady state metrics; a steady state historical data window size; a steady state aggregate window size; one or more aggregated windowing functions; a steady state percentage window size; a steady state sampling interval; one or more threshold percentages for steady state determination, which may be metric-specific; a threshold number of consecutive percentage difference values for steady state determination; etc.

Further, user preference parameters for prediction data gathering phase 204 may include: a length of time for gathering historical utilization data; an interval time for periodically fetching historical utilization data; a total number of times to gather historical utilization data; one or more types of historical utilization data to gather; one or more historical utilization metrics to omit from a default set of metrics to be gathered; criteria for determining whether sufficient historical utilization data have been gathered; etc.

Also, user preference parameters for BPS prediction phase 206 may include: a threshold_I/O value for BPS prediction; a set of database objects to analyze; an interval for periodically performing BPS prediction; a composite prediction aggregation function; a coverage implementation type (e.g., heuristic or machine learning); a coverage constant value; etc.

One or more of the parameters listed above may, alternatively or additionally, be indicated in configuration data for BPS application 114, which may be maintained by DBMS 160. Configuration values included in configuration data may be considered default values, which are superseded, for a particular optimal BPS prediction request, by user preference parameters included in the request. The configuration values included in configuration data may be user-configured values provided by DBA or may be default values for BPS application 114. As used herein, unless otherwise specified, a "configuration value" may be in configuration data or may be a user preference parameter provided in a request for optimal BPS prediction.

4. Steady State Detection Phase

According to some embodiments, before collecting historical utilization data for BPS prediction, BPS application 114 enters steady state detection phase 202. A workload is not in a steady state during periods of transition, such as during start-up or during transition between states of the workload. During periods of transition, a higher number of I/O requests are made to populate or re-populate the buffer pool than is generally performed when the workload is in a steady state. Collecting data during a steady state of the workload ensures that the gathered metrics are representative of the workload and do not include merely temporary and accidental outliers that would skew the data. In contrast, data collected during a period of transition might show unusual disk I/O request rates or buffer pool activity that would decrease the accuracy of BPS predictions.

Figure 3:
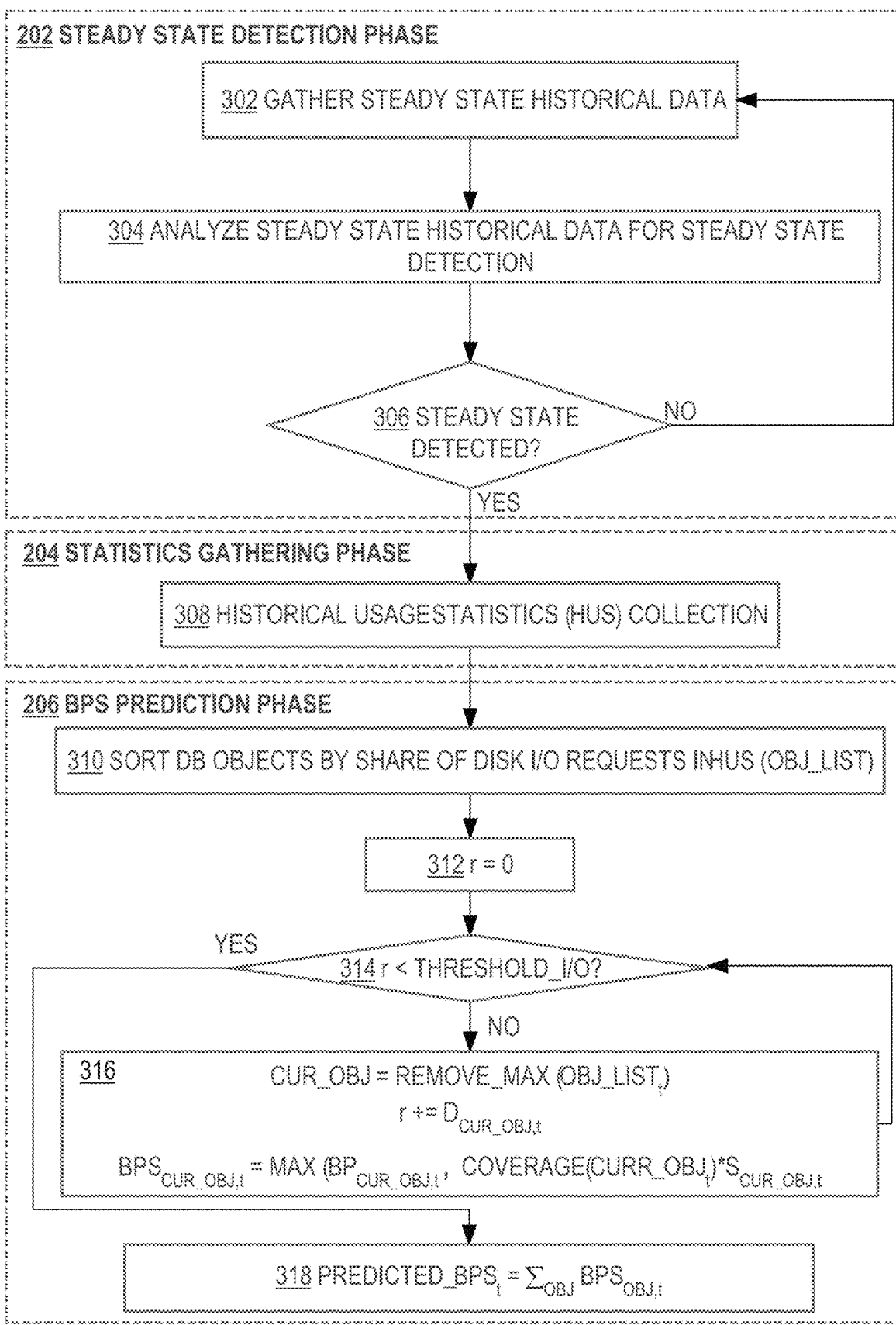
FIG. 3 depicts a flowchart with example sub-steps for the phases of the BPS prediction technique.

FIG. 3 depicts a flowchart 300 with sub-steps of phases 202-206. At step 302 of steady state detection phase 202, BPS application 114 gathers steady state historical data, for target workload 116, comprising one or more steady state metrics (such as one or more of throughput (queries or transactions per second), buffer pool hit rate, etc.). The steady state historical data are gathered over a minimum amount of time, e.g., indicated by a steady state aggregate window size.

For example, a steady state historical data window size indicated in configuration data for BPS application 114 is 30 minutes, and the request for an optimal BPS prediction included a user preference parameter for a steady state historical data window size of 10 minutes. Furthermore, a steady state sampling interval value in configuration data indicates 30 seconds, and the request did not include a steady state sampling interval parameter. Furthermore, BPS application 114 is configured to gather, as the steady state historical data, both queries per second and buffer pool hit rates. According to an embodiment, the BPS application 114 records, for each interval ending at a timestamp t, an average queries per second and an average buffer pool hit rate gathered, e.g., each second, over the preceding interval.

Figure 4A:
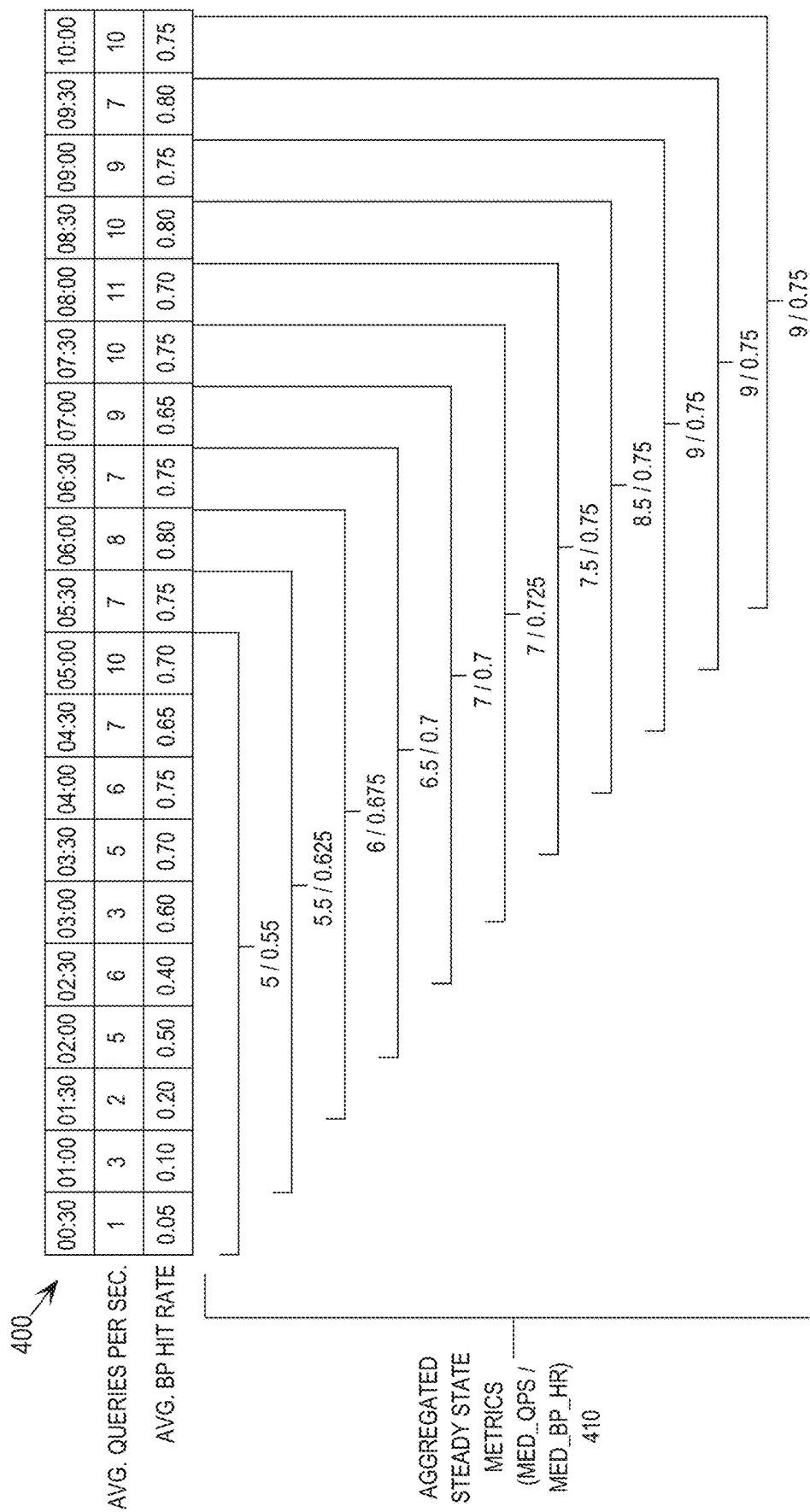

FIG. 4A depicts example steady state historical data 400, gathered by BPS application 114 from DBMS 160, that includes an average queries per second for workload 116 and an average buffer pool hit rate for buffer pool 120 (the data cache for workload 116) every 30 seconds for a window of 10 minutes.

At step 304 of steady state detection phase 202, once steady state metrics have been gathered for at least the minimum amount of time, BPS application 114 determines whether workload 116 is in a steady state based on analysis of the steady state historical data. Specifically, once the minimum steady state historical data 400 has been gathered, BPS application 114 calculates one or more aggregated steady state metrics based on one or more aggregated windowing functions (such as median, mean, mode, standard deviation, etc.) on the steady state historical data with a window size indicated by a steady state aggregate window size configuration value. Windowing helps to smooth out noise in the steady state historical data, which avoids false detection of steady state. By making appropriate choices on window sizes and functions, sustained changes in target metrics can be detected.

Figure 4B:
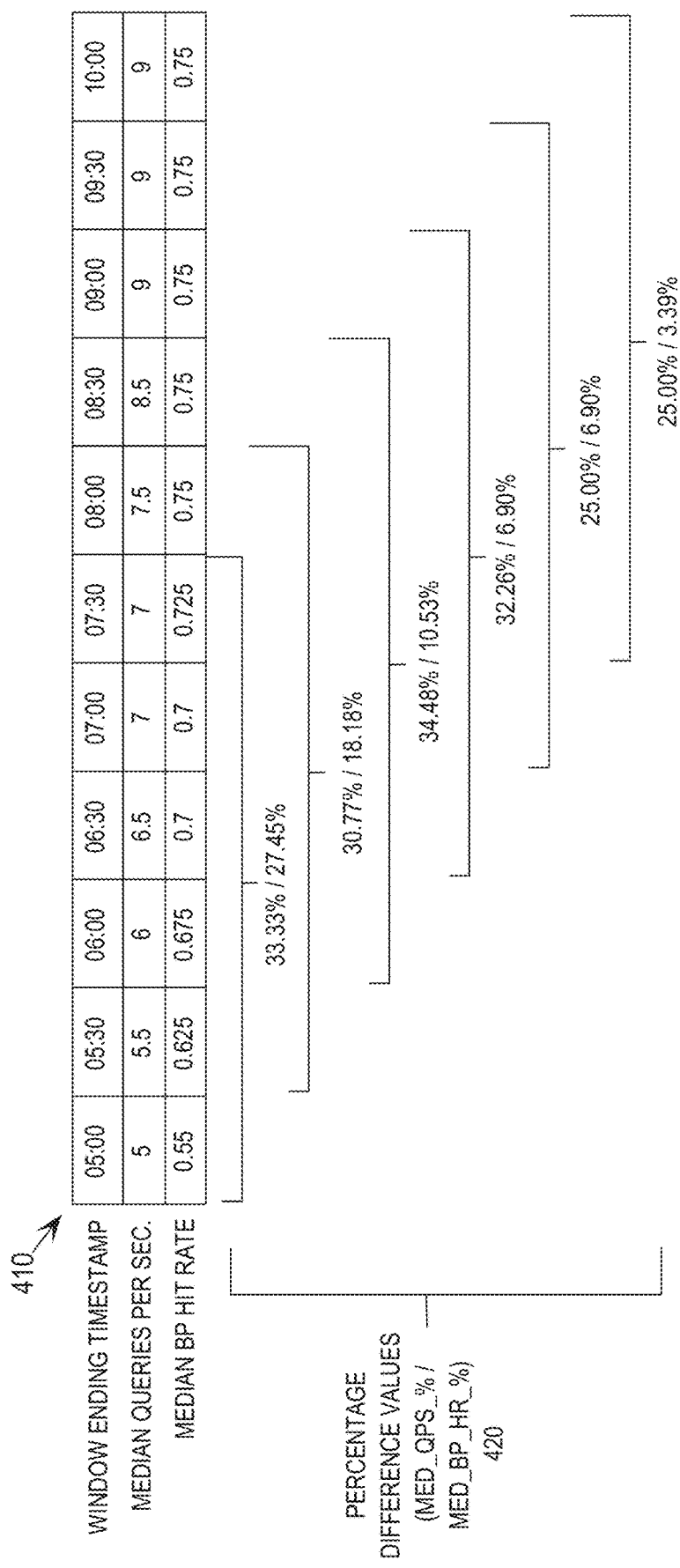

To illustrate, BPS application 114 is configured to calculate the median values of both types of collected steady state metrics with a steady state aggregate window size of five minutes. As shown in FIG. 4A, BPS application 114 calculates aggregated steady state metrics 410 from the collected steady state historical data 400. In aggregated steady state metrics 410, each window is associated with a median queries per second (MED_QPS) value followed by a median buffer pool hit rate (MED_BP_HR) value delineated by a '/' character. FIG. 4B further depicts aggregated steady state metrics 410 in table form, where each set of aggregated steady state metrics is associated with the ending timestamp of the associated steady state aggregate window.

According to some embodiments, BPS application 114 applies a second rolling window function to calculate the percentage difference between latest and oldest of each aggregated steady state metric in a second window, the size of which is based on a steady state percentage window size configuration value. The resulting percentage difference value indicates how much the target metric value has changed over the steady state percentage window. For example, a default steady state percentage window size indicated in configuration data for BPS application 114 is 7 minutes, and no steady state percentage window size parameter was included in the request.

To illustrate, as shown in FIG. 4B, BPS application 114 calculates percentage difference values 420 from aggregated steady state metrics 410. In percentage difference values 420, each window is associated with a percentage difference value for the median queries per second (MED_QPS_%) followed by a percentage difference value for the median buffer pool hit rate (MED_BP_HR_%) delineated by a '/' character.

BPS application 114 determines, for each aggregated steady state metric, whether a threshold number (N) of these "percentage difference values" are below a threshold. If N consecutive percentage difference values are below the threshold, the metric can be said to have been stable during the observation period and hence the workload has achieved steady state.

To illustrate, a configuration value for BPS application 114 indicates a threshold percentage for steady state determination of 10% (for both metric types), and a threshold number of consecutive percentage difference values for steady state determination of N=5. Accordingly, BPS application 114 determines that only the percentage difference values 420 for the median buffer pool hit rate metric for the windows ending in timestamps 09:00, 09:30, and 10:00 satisfy the threshold percentage for steady state determination, and no percentage difference values 420 for the median queries per second metric satisfy the threshold percentage for steady state determination. Thus, BPS application 114 determines that workload 116 is not in a steady state because less than five (i.e., zero) percentage difference values for the median queries per second metric satisfy the threshold percentage for steady state determination, and less than five (i.e., three) percentage difference values for the median buffer pool hit rate metric satisfy the threshold percentage for steady state determination.

According to some embodiments, BPS application 114 marks data collected at each timestamp associated with a window that satisfies the threshold percentage for steady state determination with a flag that signals the presence of steady state at that point in time. To illustrate, FIG. 4C depicts example steady state historical data 430 (with values corresponding to example steady state historical data 400), which includes steady state flags for each timestamp. In example steady state historical data 430, buffer pool hit rate metric-specific flags are set at timestamps 09:00, 09:30, and 10:00, and no other flags are set, which reflects the example steady state determinations described above.

At step 306 of steady state detection phase 202, if a steady state of target workload 116 is not detected based on the historical data satisfying steady state conditions, control is passed back to step 302 and BPS application 114 continues to gather steady state historical data. During a return to gathering of steady state historical data, BPS application 114 may gather data for an amount of time indicated by a configuration value for steady state aggregate window size, or may gather data for a shortened amount of time, before returning to step 304.

5. Prediction Data Gathering Phase

Further, at step 306, if a steady state of target workload 116 is detected, BPS application 114 enters data gathering phase 204 of flowchart 200. According to an embodiment, steady state monitoring activities continue while in phases 204 and 206. If it is determined that target workload 116 exits a steady state, BPS application 114 reverts to steady state detection phase 202.

At step 308 of prediction data gathering phase 204, BPS application 114 periodically collects historical utilization data for workload 116 from DBMS 160 and stores gathered data as DBMS metrics logs, e.g., in memory 118, and/or in persistent storage 130, etc. According to some embodiments, the interval used to periodically fetch historical utilization data may be tuned, as indicated above.

To illustrate, at each timestamp t during the applicable time period for collecting historical utilization data (e.g., indicated in a configuration value), BPS application 114 collects one or more of the following types of historical utilization data: the set of active database objects for the target workload; the amount of space in the buffer pool occupied by each active database object; the total size of index and data pages on disk that belong to each active database object; the number of disk I/O requests for each active database object; the total number of disk I/O requests for the workload; buffer pool utilization; a rate of pages not made young per thousand reads (e.g., how many pages in the buffer pool remain unchanged during an applicable time interval); disk write count per second; and buffer pool hit rate. For clarity of explanation, DBMS 160 is described below as being implemented using MySQL. However, the problems and techniques described herein are applicable to other DBMS implementations.

BPS application 114 gathers, for target workload 116, the set of active database objects (ACTIVE_OBJECTS$_t$) at each timestamp t. For example, BPS application 114 retrieves ACTIVE_OBJECTS$_t$ by causing a SHOW PROCESSLIST command to be executed by DBMS 160 based on privileges, of DBMS 160, that provide access to target workload 116. BPS application 114 identifies a set of active user schemas that are associated with workload 116 in DBMS 160 based on the results of the command. Then, BPS application 114 identifies the set of active database objects (ACTIVE_OBJECTS$_t$) for workload 116 by querying the list of database objects belonging to these active schemas.

BPS application 114 further gathers, for target workload 116, the amount of space (e.g., in bytes) in buffer pool 120 occupied by each active database object (BP$_{obj,t}$) in ACTIVE_OBJECTS$_t$ at each timestamp t. For example, BPS application 114 obtains BP$_{obj,t}$ for each active database object identified for workload 116 by querying a database object containing information about the pages stored in buffer pool 120, e.g., "information_schema.innodb_buffer_page", to identify all index and data pages in buffer pool 120 associated with the database object, and then aggregating the sizes of the identified pages.

BPS application 114 further gathers, for target workload 116, the total size (e.g., in bytes) of index and data pages on disk that belong to each active database object (S$_{obj,t}$) in ACTIVE_OBJECTS$_t$ at each timestamp t. For example, BPS application 114 obtains S$_{obj,t}$ for each active database object identified for workload 116 by querying a database object containing information about the sizes of database objects (e.g., database objects 134A-N) managed by DBMS 160, such as "data_length" and "index_length" from "information_schema.tables".

BPS application 114 also gathers, for target workload 116, the share (e.g., percentage) of the total number of disk I/O requests for each active database object (D$_{obj,t}$) in ACTIVE_OBJECTS$_t$ at each timestamp t. The share of disk I/O for a given object at a timestamp t is based on the total number of disk I/O requests for target workload 116 during the interval marked by timestamp t, and also the number of disk I/O requests for the object during the interval marked by timestamp t. For example, BPS application 114 obtains the needed information for each active database object identified for workload 116 by querying a database object containing information about disk I/O requests, such as "performance_schema.file_summary_by_instance". BPS application 114 calculates the share of the total number of disk I/O requests for each active database object by dividing the number of disk I/O requests for each database object by the total number of disk I/O requests for target workload 116.

During prediction data gathering phase 204, BPS application 114 determines whether sufficient historical utilization data have been gathered based on historical utilization data sufficiency criteria. For example, historical utilization data sufficiency criteria may be indicated in one or more configuration values, e.g., based on a number of times to gather historical utilization data or a duration of time over which to gather historical utilization data. If a target workload is known to be stable, a single instance of gathering historical utilization data may be sufficient for BPS prediction. If the historical utilization data sufficiency criteria comprise a duration of time (e.g., 30 minutes), BPS application 114 automatically collects historical utilization data over the duration of time based at each interval (e.g., every 60 seconds) indicated by a configuration value.

According to some embodiments, BPS application 114 performs BPS prediction phase 206 for each timestamp t at which historical utilization data are collected. According to another embodiment, BPS application 114 performs BPS prediction phase 206 for multiple sets of historical utilization data collected at multiple timestamps.

6. Buffer Pool Size Prediction Phase

Once BPS application 114 determines that sufficient historical utilization data have been gathered at prediction data gathering phase 204, BPS application 114 enters BPS prediction phase 206. During BPS prediction phase 206, BPS application 114 predicts a BPS for target workload 116 that maximizes the buffer pool hit rate for buffer pool 120 without causing over-provisioning of the buffer pool.

During BPS prediction phase 206, BPS application 114 identifies one or more database objects, of the set of active database objects for the target workload, for optimal size prediction analysis. This identification is based, at least in part, on historical utilization data that comprise a number of requests to read from said each database object. For each identified database object, an object-specific buffer pool size component is determined, and predicted optimal BPS is calculated based on the object-specific buffer pool size components for the one or more identified database objects.

According to some embodiments, at step 310 of BPS prediction phase 206, BPS application 114 creates a sorted list (Obj_List$_t$) of the set of active database objects for target workload 116, ACTIVE_OBJECTS$_t$, based on the share of disk I/O requests attributable to each database object (D$_{obj,t}$) from the historical utilization data at timestamp t. For example, the historical utilization data gathered at a particular timestamp t$_1$ indicates that workload 116 is associated with ACTIVE_OBJECTS$_t$ database object 134A-D (FIG. 1). The database objects are associated with the following percentages of the total disk I/O requests for workload 116 during the interval marked by timestamp t$_1$: 10% for database object 134A; 50% for database object 134B; 35% for database object 134C; and 5% for database object 134D. Thus, at step 310, BPS application 114 creates the following Obj_List$_{t1}$=(0) database object 134B (D$_{obj,t1}$=50%); (1) database object 134C (D$_{obj,t1}$=35%); (2) database object 134A (D$_{obj,t1}$=10%); (3) database object 134D (D$_{obj,t1}$=5%).

As indicated in further detail below in connection with steps 312-316 of BPS prediction phase 206, BPS application 114 identifies one or more database objects, of the set of active database objects, for optimal BPS prediction analysis based, at least in part, on the shares of the total disk I/O requests determined for the objects. Specifically, BPS application 114 identifies active database objects for optimal BP size prediction analysis, in descending order based on share of total I/O requests, until the accumulated share of total I/O requests for analyzed database objects exceeds a threshold_I/O value, e.g., a configuration value of 0.9. Threshold_I/O values are also discussed in further detail below.

To illustrate, at step 312, BPS application 114 sets a cumulative disk I/O share (D$_{obj,t1}$) value, r, to zero. At step 314, while r is less than the threshold_I/O value, e.g., 0.90, BPS application 114 performs step 316. Thus, initially when r is zero, control passes to step 316.

At step 316, "cur_obj=remove_max (Obj_List$_{t1}$)", such that BPS application 114 pops, from Obj_List$_{t1}$, the database object with a maximum D$_{obj,t1}$, where Obj_List$_{t1}$ contains the active database objects that have not yet been analyzed for optimal BP size prediction. For example, BPS application 114 pops database object 134B (with the highest $D_{obj,t1}$ of 50%) off $Obj\_List_{t1}$ such that database object 134B becomes cur_obj.

Also at step 316, "r+=$D_{cur\_obj,t1}$", such that BPS application 114 adds the share of the total disk I/O for database object 134B to r. Because r was initialized to 0, after the current iteration of step 316, r equals 0.5 ($D_{obj,t1}$ for database object 134B).

Further, at step 316, "BP_SIZE=$D_{cur\_object,t1}$=max(BP-$_{cur\_object,t1}$, coverage (cur_obj)*$S_{cur\_object,t1}$)", such that BPS application 114 determines an object-specific buffer pool size component for database object 134B (cur_obj). This determination is based on a coverage function for the cur_obj. The coverage function returns a value in [0,1], which represents the buffer pool space (as a fraction of the disk size of cur_obj) calculated to achieve an optimal hit rate (e.g., 100% or close to 100%) for cur_obj. In other words, this function is configured to return an estimate of the ratio of the working set size of a database object to its total size. It is noteworthy that the working set size of a database object (and a schema as a whole) is a function of the temporal and spatial access distribution of active queries, and therefore, calculating an accurate estimate of the working set size of a database object is non-trivial. Nevertheless, described below are both a heuristic-based and a machine learning (ML)-based approach to approximating the working set size of any given database object.

According to some embodiments, the object-specific buffer pool size component for the current database object (e.g., database object 134B) is the maximum of (a) the amount of space in buffer pool 120 occupied by database object 134B (e.g., $BP_{obj,t1}$=2 GB, where buffer pool 120 is 4 GB total), and (b) the "coverage" determined for database object 134B (e.g., 0.9) multiplied by the total size of index and data pages on disk that belong to database object 134B (e.g., $S_{obj,t1}$=3 GB). For example, BPS application 114 determines that the object-specific buffer pool size component for database object 134B is max(2 GB, 0.9*3 GB)=2.7 GB.

Continuing with the example database objects above, BPS application 114 returns to step 314, and determines that the current value of r, 0.5, is less than the threshold_I/O value of 0.9.

Accordingly, BPS application 114 returns to step 316, and pops the database object with the highest $D_{obj,t1}$ not yet analyzed off $Obj\_List_{t1}$ (comprising (0) database object 134C (35%); (1) database object 134A (10%); (2) database object 134D (5%)), which is database object 134C. BPS application 114 adds 0.35 ($D_{obj,t1}$ for database object 134C) to the current value of r (0.5), such that r=0.85. The amount of space in buffer pool 120 occupied by database object 134C is $BP_{obj,t1}$=1.4 GB, the "coverage" determined for database object 134C is 0.9, and the total size of index and data pages on disk that belong to database object 134C is $S_{obj,t1}$=1.5 GB. Thus, BPS application 114 determines that the object-specific buffer pool size component for database object 134C is max(1.4 GB, 0.9*1.5 GB)=1.4 GB.

Again, BPS application 114 returns to step 314, and determines that the current value of r, 0.85, is less than the threshold_I/O value of 0.9.

Accordingly, BPS application 114 returns to step 316, and pops the database object with the highest $D_{obj,t1}$ not yet analyzed off $Obj\_List_{t1}$ (comprising (0) database object 134A (10%); (1) database object 134D (5%)), which is database object 134A. BPS application 114 adds 0.1 ($D_{obj,t1}$ for database object 134A) to the current value of r (0.85), at which point r=0.95. The amount of space in buffer pool 120 occupied by database object 134A is $BP_{obj,t1}$=0.4 GB, the "coverage" determined for database object 134A is 0.9, and the total size of index and data pages on disk that belong to database object 134A is $S_{obj,t1}$=0.5 GB. Thus, BPS application 114 determines that the object-specific buffer pool size component for database object 134A is max(0.4 GB, 0.9*0.5 GB)=0.45 GB.

Again, BPS application 114 returns to step 314, and determines that the current value of r, 0.95, is greater than the threshold_I/O value of 0.9. Because the value of r is at or above the threshold_I/O value, control passes to step 318.

At step 318, the predicted buffer pool size for buffer pool 120 at a given timestamp t is the sum of the object-specific buffer pool size components of all of the identified database objects. For example, for timestamp $t_1$, BPS application 114 determines that the predicted size for buffer pool 120 is 2.7 GB+1.4 GB+0.45 GB=4.55 GB. According to some embodiments, the sum of the object-specific buffer pool size components of all of the identified database objects is the predicted BPS for the timestamp. According to some embodiments, BPS application 114 generates the predicted BPS by adding, to the sum of the object-specific buffer pool size components of all of the identified database objects, a size of the buffer pool currently allocated to database objects not identified for optimal buffer pool size prediction analysis.

The final BPS prediction may be based on a single set of historical utilization data collected at a timestamp t. However, configuration values may indicate that multiple sets of historical utilization data at multiple timestamps are to be used for a single BPS prediction. In this case, BPS application 114 performs a timestamp-specific prediction of optimal BPS for each timestamp, e.g., based on performing steps 312-318 of flowchart 300, for each timestamp $t_i$. In this case, BPS application 114 produces an BPS prediction for each gathered set of historical utilization data. According to some embodiments, these multiple predictions are returned, as a set, in a response to a request for BPS prediction. According to some embodiments, these multiple predictions are aggregated to produce a final BPS prediction using any composite prediction aggregation function, such as maximum, median, mean, etc., which may be indicated as a configuration value, to fit the optimization policy in configuration information for a given database system.

According to some embodiments, BPS application 114 stores the final predicted BPS for buffer pool 120 in memory, e.g., in memory 118 and/or in persistent storage 130. According to some embodiments, BPS application 114 automatically adjusts the size of buffer pool 120 to the predicted optimal BPS, e.g., using the MySQL command: SET global innodb_buffer_pool_size=predicted_size.

6.1. Threshold_I/O Value

The threshold_I/O value is a constant value that controls the total amount of disk I/O that is targeted for optimal BPS prediction analysis, and can take any value between [0,1]. For instance, if threshold_I/O is set to 0.8, the database objects identified for optimal BPS prediction analysis are the active database objects that cumulatively incur 80% of total disk I/O requests for the target workload.

Figure 5A:
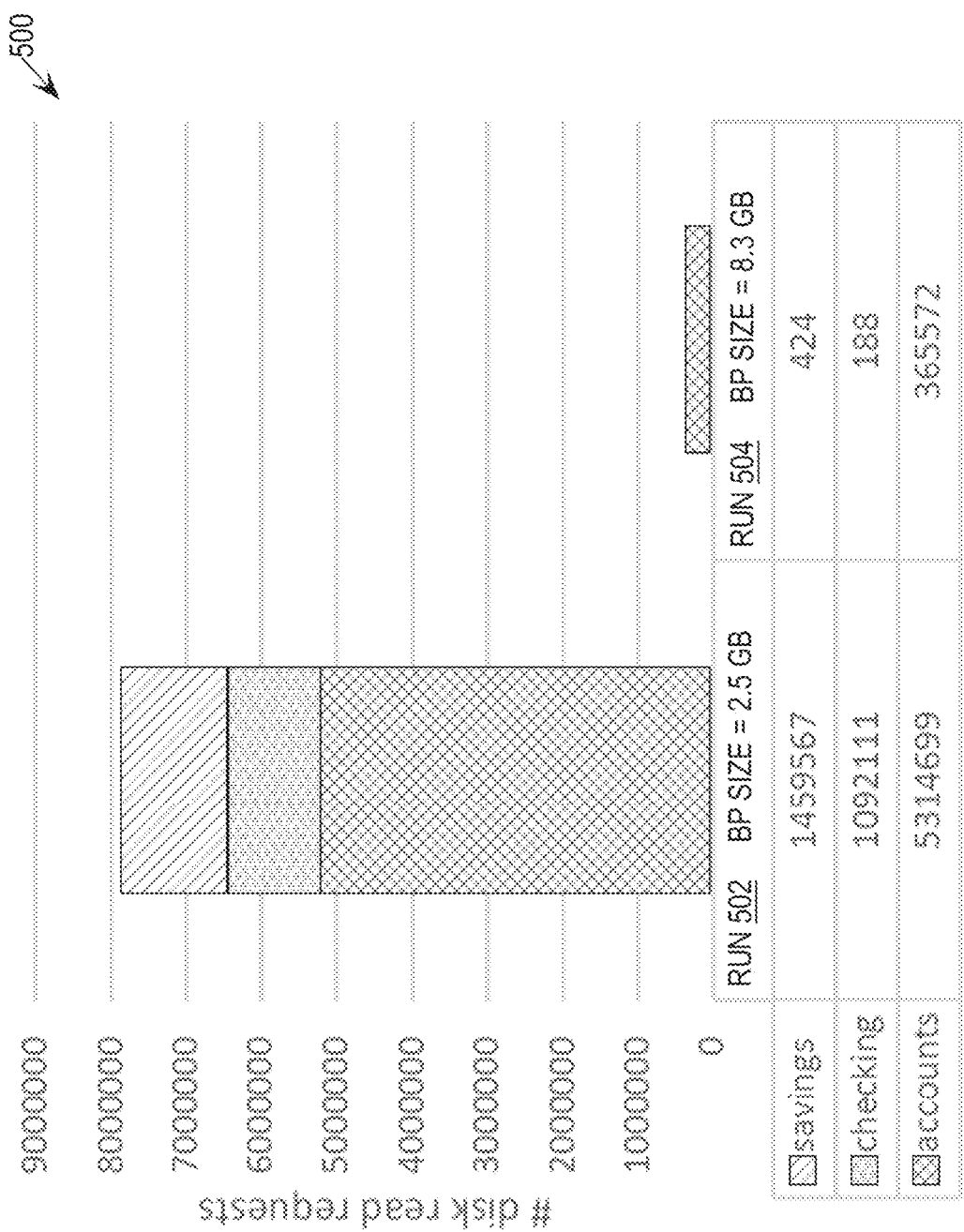
FIGS. 5A-5B depict graphs of historical utilization data gathered from running a particular workload with two different buffer pool sizes.

Thus, as described in detail above, database objects that cause the bulk of disk I/O requests for a given workload are identified for optimal BPS prediction analysis. To justify this, data is presented regarding the relationship between disk I/O requests and the additional buffer pool space needed to achieve a perfect hit rate for database objects in several workloads. Specifically, a first workload that accesses a "savings" table, a "checking" table, and an "accounts" table is run on the same machine twice. In an initial run 502, depicted in FIG. 5A, the BPS is set to 2.5 GB, which is smaller than what is needed by this first workload to achieve a 100% hit rate. As shown in FIG. 5A, during run 502, the disk I/O requests for each of the tables are observed.

Figure 5B:
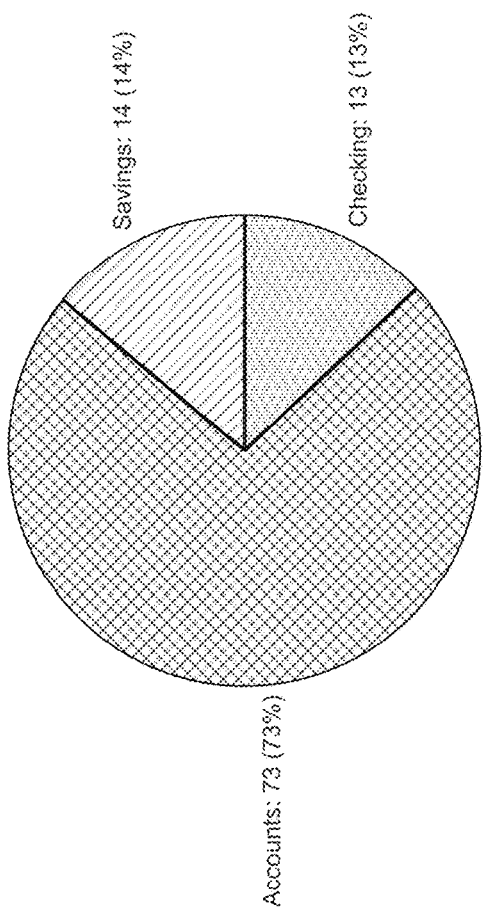
Figure 5B:
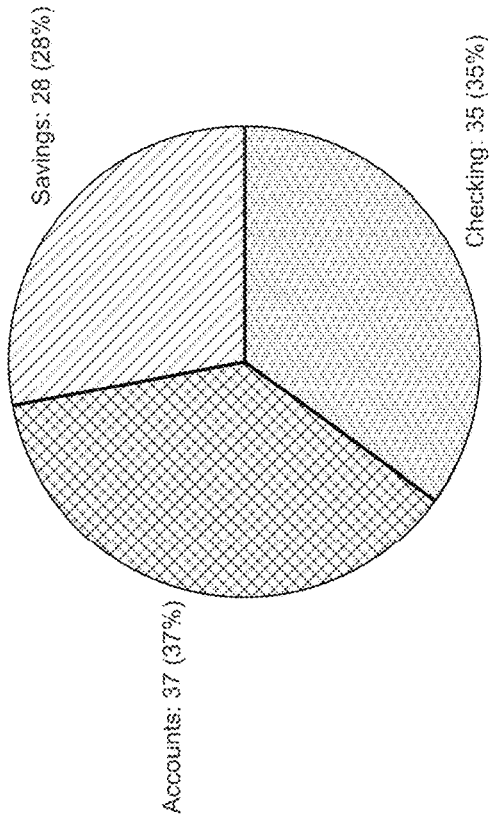

FIG. 5B further shows the allocation of buffer pool space for run 502 among the three database objects. Specifically, when the buffer pool size is 2.5 GB, memory allocation is almost equally divided among the database objects. However, 67% of all disk I/O requests are incurred when accessing data that belongs to the "accounts" table, while 14% of total disk I/O requests are incurred when accessing the "checking" table and 19% of total disk I/O requests are incurred when accessing the "savings" table. Thus, the "accounts" table is under-represented in the buffer pool, and therefore, should be the prime target for optimization (buffer pool growth).

The determination that the "accounts" table should have a greater representation in the buffer pool in order to optimize the workload is further confirmed by the data from run 504 of the first workload. In run 504, the buffer pool size is 8.3 GB, which is sufficient to reach 100% buffer pool hit rate. FIG. 5B shows that more than 95% of disk requests are eliminated when using the larger buffer pool size. Interestingly, FIG. 5B shows that the share of the "accounts" table in the buffer pool during run 504 increased to 73%, which, in turn, means that this table has grabbed almost 90% of the added buffer pool memory.

Following the same trend, analysis on a wide variety of workloads shows that, when a workload hit rate is less than 100%, the relative database object-specific shares of total disk I/O requests are good indicators of which database objects should be targeted for BPS growth optimization.

However, in some cases, there might not be a significant difference among disk I/O request data of different database objects being accessed for a given workload. To illustrate, a second example (OLTP_read_write-type) workload accesses 10 database objects, which are almost the same in terms of size and access pattern (uniform). In this example, the share of disk I/O requests is uniformly distributed among all database objects, which signifies the fact that all database objects are equally important for this workload in terms of their buffer pool needs and impact. This determination of equal importance is confirmed based on running the workload with a BPS of 8.4 GB and then running the workload with a BPS of 22.4 GB. During the first run, the workload incurred close to 18 million disk I/O read requests, which were substantially equally attributed to the database objects. During the second run, the workload incurred close to zero I/O read requests. Nevertheless, during both of the runs, the buffer pool space was substantially equally allocated to the 10 database objects.

Based on the observation that object-specific shares of disk I/O requests are good differentiators to select "important" database objects for BPS prediction purposes, this metric is used to identify database objects for optimal buffer pool size prediction analysis, as described above. Specifically, according to some embodiments, the threshold_I/O value functions as a threshold to choose the most "important" set of active database objects for optimal BPS prediction analysis. Thus, setting threshold_I/O=1 means that all database objects contributing to disk I/O requests will be identified for optimal buffer pool size prediction analysis. As evidenced by the two examples above, when the share of disk I/O requests of database objects is more or less the same, the database objects should be treated equally. In such cases, threshold_I/O=1 is the right choice.

However, in many cases, there is a subset of database objects for a workload that dominate the share of disk I/O requests, such as with the workload depicted in FIGS. 5A-B. In such cases, by choosing a threshold_I/O value that is somewhat less than 1, the number of database objects that will be identified for optimal buffer pool size prediction analysis is reduced, sometimes drastically. To illustrate, for the workload depicted in FIGS. 5A-5B, the accounts table has an object-specific disk I/O share of 67%, the savings table has an object-specific disk I/O share of 19%, and the checking table has an object-specific disk I/O share of 14%. If threshold_I/O is set to 0.65 during analysis of this workload, based on historical utilization data reflecting these object-specific disk I/O shares, BPS application 114 will correctly identify the topmost influential database object ("accounts" table) and base the BPS prediction on this table. Furthermore, if threshold_I/O is set to 0.7 during analysis of this workload based on historical utilization data reflecting these object-specific disk I/O shares, BPS application 114 will correctly identify the two topmost influential database object (the "accounts" table and the "savings" table) and base the BPS prediction on these tables. Because the "checking" table has the lowest share of the total disk I/O requests, omitting this table from optimal BPS prediction analysis has less effect on workload efficiency, when implementing the resulting predicted BPS, than omitting any other table from analysis.

According to some embodiments, BPS application 114 automatically determines whether a workload includes one or more "important" database objects based on a mean ("avg") and standard deviation ("stdev") of object-specific shares of disk I/O requests for all active database objects for the workload. If the stdev<0.5*avg, then it is determined that all active database objects for the workload are relatively the same "importance" in terms of disk I/O requests, and BPS application 114 automatically sets threshold_I/O=1. Otherwise, there is a disparity in the object-specific shares of disk I/O requests, and BPS application 114 automatically sets threshold_I/O to a value lower than one. For example, BPS application 114 sets threshold_I/O to a default value of 0.9, which offers a good trade-off between ignoring less-important database objects (especially for workloads accessing a very large number of relatively unimportant database objects), while still identifying the most important database objects for optimal BPS prediction analysis.

6.2. Constant Database Object Coverage Estimate

According to some embodiments, BPS application 114 implements a heuristic-based approach to approximating the working set size of any given database object for the coverage function. "Coverage" is defined herein to be the ratio of the space occupied in the buffer pool by a database object ($BP_{obj}$) to its size (data pages and index) on disk ($S_{obj}$). For instance, if $S_{obj}$ of a database object is 5 GB, and $BP_{obj}$ for this database object is 2 GB, then the current coverage for the object is 0.4 or 40%. The coverage function returns, for a given object, $ideal\_coverage_{obj}$, which is the ratio of the smallest buffer pool space predicted to be needed for a database object to achieve 100% hit rate, to its size on disk ($S_{obj}$).

Figure 6:
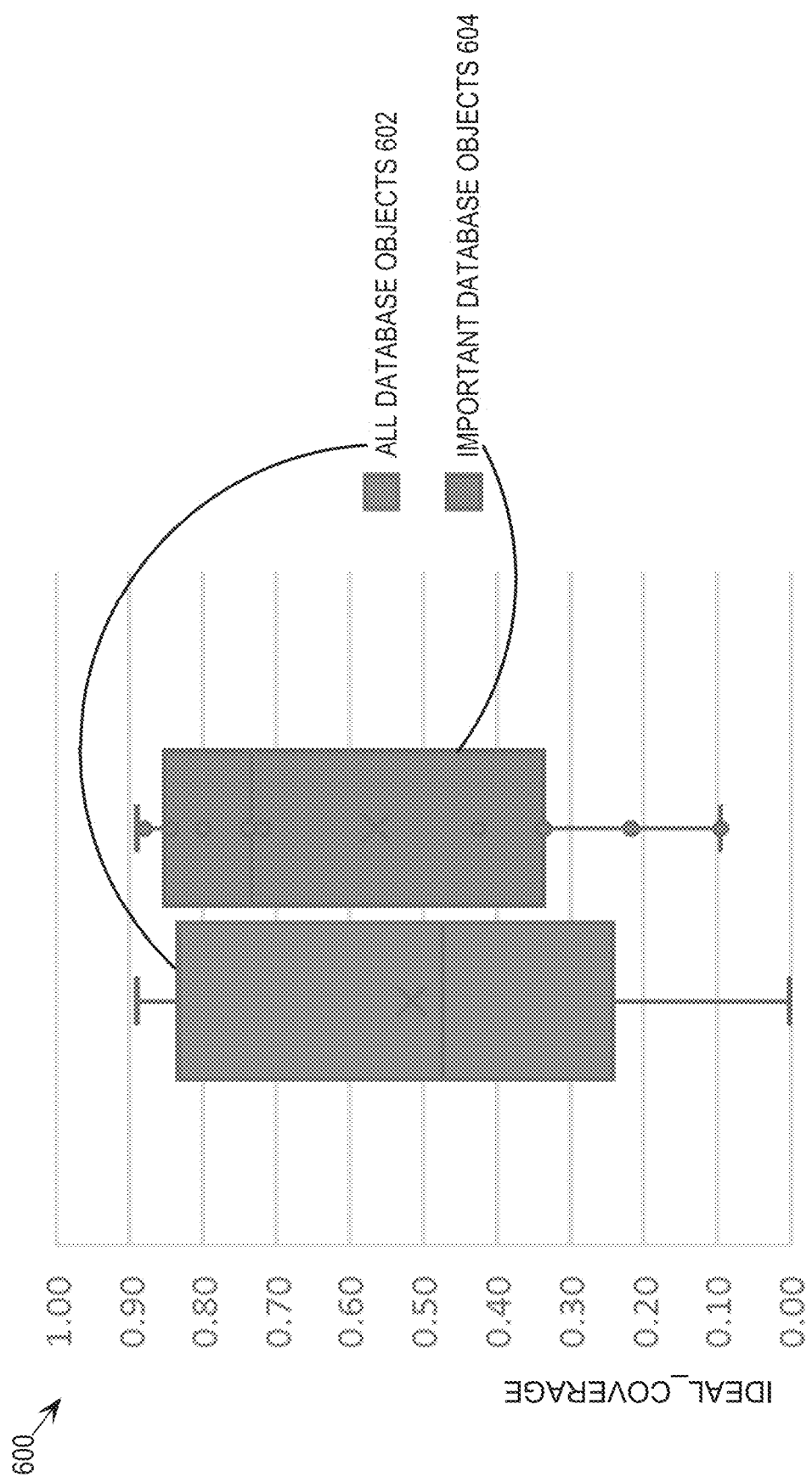
FIG. 6 depicts a graph showing ranges of observed ideal_coverage values for database objects present in eight example workloads.

For the heuristic-based approach to implementing the coverage function, the smallest constant value for $ideal\_coverage_{obj}$, which works for most workloads, is identified. FIG. 6 depicts a graph 600 that shows the range of observed ideal_coverage values for the database objects present in eight benchmark workloads. These workloads have a range of query access patterns, from uniform access to Zipfian with different exponent values. A Zipfian access pattern with a high exponent value will have a low ideal_coverage value, while a uniform access pattern will have an ideal_coverage value close to 1. In graph 600, range indicator 602 indicates the ideal_coverage range for all database objects in the example schemas, and range indicator 604 indicates the ideal_coverage range of all "important" database objects in the example schemas based on a constant threshold_I/O value.

As shown in graph 600, ideal_coverage takes a wide range of values, where the maximum ideal_coverage value is roughly 0.9, meaning that by allocating 90% of $D_{obj}$ for each active database object in a given workload, it is very likely that the desirable 100% hit rate will be reached for the workload. Further, the median observed ideal_coverage for "important" database objects is 25% higher than the median ideal_coverage value for all database objects, which supports the identification of an ideal_coverage value, for the coverage function, at the high end of the indicated range. In general, it is better to err on the side of overestimation than underestimation, since a too low ideal_coverage value may lead to expensive disk reads. Thus, according to some embodiments, the coverage function of step 316 above returns a coverage constant value of 0.9 (which may be included as a configuration value).

6.3. Machine Learning Based Database Object Coverage Estimator

Although using a heuristic-based coverage function that returns a coverage constant value results in reasonably good BPS predictions in the general case, it may not be suitable for workloads with atypical access patterns. Therefore, a machine learning-based approach to implementing the coverage function is described.

According to some embodiments, a trained ML model 122 (e.g., a Linear Regressor-type model) is used to predict an ideal_coverage value for a given database object based on a feature vector generated from historical utilization data gathered for the database object. According to some embodiments, the feature vector comprises one or more of the following metrics, obtained from or derived from historical utilization data described above: buffer pool utilization, a rate of pages not made young per thousand reads (i.e., how many pages in the buffer pool remain unchanged during the applicable time period), disk write count per second, buffer pool hit rate, the current coverage for the database object, and the percentage of the total number of disk I/O requests for the database object during the particular time period. According to some embodiments, one or more of metrics in the feature vector are custom metrics derived from statistics that are collected from DBMS 160 (e.g., current coverage for the database object, disk read/write count per second, etc.), and provide additional insight to identify the per database object buffer pool requirements.

According to some embodiments, trained ML model 122 is used to predict a single ideal_coverage value for a given database object based on a single instance of any needed object-specific value (such as the current coverage for the database object, and/or the percentage of the total number of disk I/O requests for the database object during the particular time period), which is then used to generate all object-specific BPSs for the database object. According to some embodiments, trained ML model 122 is used to predict a distinct ideal_coverage value for a given database object for every set of historical utilization data gathered for the target workload, which is then used to generate the object-specific BPS for the database object at the associated timestamp. According to some embodiments, a summary of multiple sets of historical utilization data gathered for the target workload are aggregated or summarized to produce aggregate values for the feature set, and a single ideal_coverage value is generated for each database object. This single ideal_coverage value is used to generate each object-specific BPS for the database object at each applicable timestamp.

7. Continuous or Periodic Buffer Pool Size Prediction

A configuration value may further cause BPS application 114 to periodically perform BPS prediction to determine updated BPSs, in case of changes in workload state. For example, configuration data comprises one or more day/time indicators for initiating BPS prediction. BPS application 114 may further be configured to implement the resulting BPS prediction, e.g., if the BPS prediction is more than a threshold percentage different than the current BPS for the target workload.

According to some embodiments, BPS application 114 functions as a continuously running, independent agent that monitors the metrics of DBMS 160 to be used during BPS prediction.

8. Database Overview

Embodiments of the present invention are used in the context of database management systems (DBMSs). Therefore, a description of an example DBMS is provided. Generally, a server, such as a database server, is a combination of integrated software components and an allocation of computational resources, such as memory, a node, and processes on the node for executing the integrated software components, where the combination of the software and computational resources are dedicated to providing a particular type of function on behalf of clients of the server. A database server governs and facilitates access to a particular database, processing requests by clients to access the database.

Users interact with a database server of a DBMS by submitting to the database server commands that cause the database server to perform operations on data stored in a database. A user may be one or more applications, such as database client application 142, running on a client computer that interact with a database server. Multiple users may also be referred to herein collectively as a user.

A database comprises data and a database dictionary that is stored on a persistent memory mechanism, such as a set of hard disks. A database is defined by its own separate database dictionary. A database dictionary comprises metadata that defines database objects contained in a database. In effect, a database dictionary defines the totality of a database. Database objects include tables, table columns, and tablespaces. A tablespace is a set of one or more files that are used to store the data for various types of database objects, such as a table. If data for a database object is stored in a tablespace, a database dictionary maps a database object to one or more tablespaces that hold the data for the database object.

A database dictionary is referred to by a DBMS to determine how to execute database commands submitted to a DBMS. Database commands can access the database objects that are defined by the dictionary.

A database command may be in the form of a database statement. For the database server to process the database statements, the database statements must conform to a database language supported by the database server. One non-limiting example of a database language that is supported by many database servers is SQL, including proprietary forms of SQL supported by such database servers as Oracle and MySQL. SQL data definition language ("DDL") instructions are issued to a database server to create or configure database objects, such as tables, views, or complex types. Data manipulation language ("DML") instructions are issued to a DBMS to manage data stored within a database structure. For instance, SELECT, INSERT, UPDATE, and DELETE are common examples of DML instructions found in some SQL implementations. SQL/XML is a common extension of SQL used when manipulating XML data in an object-relational database.

Referring to FIG. 1, example network arrangement 100 comprises database management system (DBMS) 160 comprises a computing device 110 running a database server instance 112, and a database 132 in persistent storage 130. DBMS 160 may correspond to various types of database systems, such as a clustered database system and/or a multi-tenant database system. Database 132 includes database objects 134A-N, where the label "N" in "134N," and in any other reference numeral herein, connotes that any number of elements, items, or sets of items may be present or used in embodiments, as in "1 to N items". Data from database 132 may reside in volatile and/or non-volatile storage, such as memory 118 of computing device 110 and persistent storage 130. Thus, database 132 may include a virtual disk and/or a set of physical disks. Additionally or alternatively, database 132 may be stored, at least in part, in main memory of a computing device.

A single-node DBMS, such as example DBMS 160, comprises a single node that runs a database server instance that accesses and manages the database. However, embodiments may be implemented on a multi-node database management system, which is made up of interconnected nodes that share access to the same database. Typically, the nodes are interconnected via a network and share access, in varying degrees, to shared storage, e.g., shared access to a set of disk drives and data blocks stored thereon represented, in FIG. 1, as persistent storage 130. The nodes in a multi-node database system may be in the form of a group of computers (e.g., workstations, personal computers) that are interconnected via a network. Alternately, the nodes may be the nodes of a grid, which is composed of nodes in the form of server blades interconnected with other server blades on a rack. In such a system, the various aspects of DBMS 160, e.g., the components that are depicted as residing on computing device 110, may be implemented on another node.

Each node in a multi-node database system hosts a database server. A server, such as a database server, is a combination of integrated software components and an allocation of computational resources, such as memory, a node, and processes on the node for executing the integrated software components on a processor, the combination of the software and computational resources being dedicated to performing a particular function on behalf of one or more clients.

Resources from multiple nodes in a multi-node database system can be allocated to running a particular database server's software. Each combination of the software and allocation of resources from a node is a server that is referred to herein as a "server instance" or "instance". A database server may comprise multiple database instances, some or all of which are running on separate computers, including separate server blades.

8.1 Query Processing

A query is an expression, command, or set of commands that, when executed, causes a server to perform one or more operations on a set of data. A query may specify source data object(s), such as table(s), column(s), view(s), or snapshot (s), from which result set(s) are to be determined. For example, the source data object(s) may appear in a FROM clause of a Structured Query Language ("SQL") query. SQL is a well-known example language for querying database objects. As used herein, the term "query" is used to refer to any form of representing a query, including a query in the form of a database statement and any data structure used for internal query representation. The term "table" refers to any source object that is referenced or defined by a query and that represents a set of rows, such as a database table, view, or an inline query block, such as an inline view or subquery.

The query may perform operations on data from the source data object(s) on a row by-row basis as the object(s) are loaded or on the entire source data object(s) after the object(s) have been loaded. A result set generated by some operation(s) may be made available to other operation(s), and, in this manner, the result set may be filtered out or narrowed based on some criteria, and/or joined or combined with other result set(s) and/or other source data object(s).

Generally, a query parser receives a query statement and generates an internal query representation of the query statement. Typically, the internal query representation is a set of interlinked data structures that represent various components and structures of a query statement.

The internal query representation may be in the form of a graph of nodes, each interlinked data structure corresponding to a node and to a component of the represented query statement. The internal representation is typically generated in memory for evaluation, manipulation, and transformation.

8.2 Query Optimization

As used herein, a query is considered "transformed" when the query is (a) rewritten from a first expression or representation to a second expression or representation, (b) received in a manner that specifies or indicates a first set of operations, such as a first expression, representation, or execution plan, and executed using a second set of operations, such as the operations specified by or indicated by a second expression, representation, or execution plan, or (c) received in a manner that specifies or indicates a first set of operations, and planned for execution using a second set of operations.

Two queries or execution plans are semantically equivalent to each other when the two queries or execution plans, if executed, would produce equivalent result sets, even if the result sets are assembled in different manners by the two queries or execution plans. Execution of a query is semantically equivalent to a query or execution plan if the query execution produces a result set that is equivalent to the one that would be produced by that query or execution plan, if executed.

A query optimizer may optimize a query by transforming the query. In general, transforming a query involves rewriting a query into another query that produces the same result and that can potentially be executed more efficiently, i.e., one for which a potentially more efficient and/or less costly execution plan can be generated. A query may be rewritten by manipulating any internal representation of the query, including any copy thereof, to form a transformed query or a transformed query representation. Alternatively and/or in addition, a query may be rewritten by generating a different but semantically equivalent database statement.

9. Hardware Overview

An application, such as instance 112, BPS application 114, or database client application 142, runs on a computing device and comprises a combination of software and allocation of resources from the computing device. Specifically, an application is a combination of integrated software components and an allocation of computational resources, such as memory, and/or processes on the computing device for executing the integrated software components on a processor, the combination of the software and computational resources being dedicated to performing the stated functions of the application.

One or more of the functions attributed to any process described herein, may be performed any other logical entity that may or may not be depicted in FIG. 1, according to one or more embodiments. In some embodiments, each of the techniques and/or functionality described herein is performed automatically and may be implemented using one or more computer programs, other software elements, and/or digital logic in any of a general-purpose computer or a special-purpose computer, while performing data retrieval, transformation, and storage operations that involve interacting with and transforming the physical state of memory of the computer.

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 7:
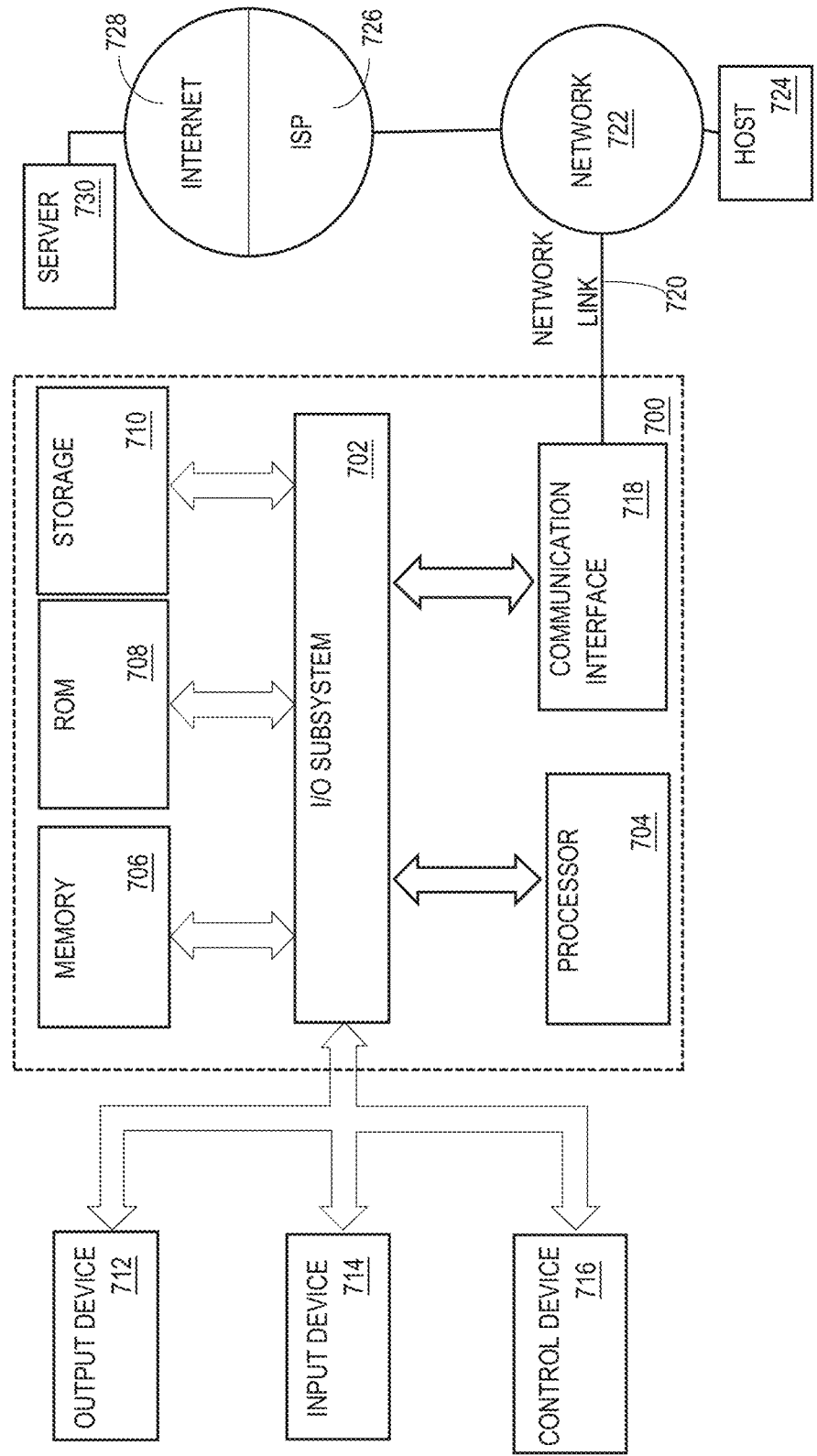
FIG. 7 is a block diagram that illustrates a computer system upon which some embodiments may be implemented.

For example, FIG. 7 is a block diagram that illustrates a computer system 700 upon which some embodiments of the invention may be implemented. Computer system 700 includes a bus 702 or other communication mechanism for communicating information, and a hardware processor 704 coupled with bus 702 for processing information. Hardware processor 704 may be, for example, a general purpose microprocessor.

Computer system 700 also includes a main memory 706, such as a random access memory (RAM) or other dynamic storage device, coupled to bus 702 for storing information and instructions to be executed by processor 704. Main memory 706 also may be used for storing temporary variables or other intermediate information during execution of instructions to be executed by processor 704. Such instructions, when stored in non-transitory storage media accessible to processor 704, render computer system 700 into a special-purpose machine that is customized to perform the operations specified in the instructions.

Computer system 700 further includes a read only memory (ROM) 708 or other static storage device coupled to bus 702 for storing static information and instructions for processor 704. A storage device 710, such as a magnetic disk, optical disk, or solid-state drive is provided and coupled to bus 702 for storing information and instructions.

Computer system 700 may be coupled via bus 702 to a display 712, such as a cathode ray tube (CRT), for displaying information to a computer user. An input device 714, including alphanumeric and other keys, is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane.

Computer system 700 may implement the techniques described herein using customized hard-wired logic, one or more ASICs or FPGAs, firmware and/or program logic which in combination with the computer system causes or programs computer system 700 to be a special-purpose machine. According to one embodiment, the techniques herein are performed by computer system 700 in response to processor 704 executing one or more sequences of one or more instructions contained in main memory 706. Such instructions may be read into main memory 706 from another storage medium, such as storage device 710. Execution of the sequences of instructions contained in main memory 706 causes processor 704 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 710. Volatile media includes dynamic memory, such as main memory 706. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 702. Transmission media can also take the form of acoustic or light waves, such as those generated during radio-wave and infra-red data communications.

Various forms of media may be involved in carrying one or more sequences of one or more instructions to processor 704 for execution. For example, the instructions may initially be carried on a magnetic disk or solid-state drive of a remote computer. The remote computer can load the instructions into its dynamic memory and send the instructions over a telephone line using a modem. A modem local to computer system 700 can receive the data on the telephone line and use an infra-red transmitter to convert the data to an infra-red signal. An infra-red detector can receive the data carried in the infra-red signal and appropriate circuitry can place the data on bus 702. Bus 702 carries the data to main memory 706, from which processor 704 retrieves and executes the instructions. The instructions received by main memory 706 may optionally be stored on storage device 710 either before or after execution by processor 704.

Computer system 700 also includes a communication interface 718 coupled to bus 702. Communication interface 718 provides a two-way data communication coupling to a network link 720 that is connected to a local network 722. For example, communication interface 718 may be an integrated services digital network (ISDN) card, cable modem, satellite modem, or a modem to provide a data communication connection to a corresponding type of telephone line. As another example, communication interface 718 may be a local area network (LAN) card to provide a data communication connection to a compatible LAN. Wireless links may also be implemented. In any such implementation, communication interface 718 sends and receives electrical, electromagnetic or optical signals that carry digital data streams representing various types of information.

Network link 720 typically provides data communication through one or more networks to other data devices. For example, network link 720 may provide a connection through local network 722 to a host computer 724 or to data equipment operated by an Internet Service Provider (ISP) 726. ISP 726 in turn provides data communication services through the worldwide packet data communication network now commonly referred to as the "Internet" 728. Local network 722 and Internet 728 both use electrical, electromagnetic or optical signals that carry digital data streams. The signals through the various networks and the signals on network link 720 and through communication interface 718, which carry the digital data to and from computer system 700, are example forms of transmission media.

Computer system 700 can send messages and receive data, including program code, through the network(s), network link 720 and communication interface 718. In the Internet example, a server 730 might transmit a requested code for an application program through Internet 728, ISP 726, local network 722 and communication interface 718.

The received code may be executed by processor 704 as it is received, and/or stored in storage device 710, or other non-volatile storage for later execution.

SOFTWARE OVERVIEW

FIG. 8 is a block diagram of a basic software system 800 that may be employed for controlling the operation of computer system 700. Software system 800 and its components, including their connections, relationships, and functions, is meant to be exemplary only, and not meant to limit implementations of the example embodiment(s). Other software systems suitable for implementing the example embodiment(s) may have different components, including components with different connections, relationships, and functions.

Software system 800 is provided for directing the operation of computer system 700. Software system 800, which may be stored in system memory (RAM) 706 and on fixed storage (e.g., hard disk or flash memory) 710, includes a kernel or operating system (OS) 810.

The OS 810 manages low-level aspects of computer operation, including managing execution of processes, memory allocation, file input and output (I/O), and device I/O. One or more application programs, represented as 802A, 802B, 802C . . . 802N, may be "loaded" (e.g., transferred from fixed storage 710 into memory 706) for execution by the system 800. The applications or other software intended for use on computer system 700 may also be stored as a set of downloadable computer-executable instructions, for example, for downloading and installation from an Internet location (e.g., a Web server, an app store, or other online service).

Software system 800 includes a graphical user interface (GUI) 815, for receiving user commands and data in a graphical (e.g., "point-and-click" or "touch gesture") fashion. These inputs, in turn, may be acted upon by the system 800 in accordance with instructions from operating system 810 and/or application(s) 802. The GUI 815 also serves to display the results of operation from the OS 810 and application(s) 802, whereupon the user may supply additional inputs or terminate the session (e.g., log off).

OS 810 can execute directly on the bare hardware 820 (e.g., processor(s) 704) of computer system 700. Alternatively, a hypervisor or virtual machine monitor (VMM) 830 may be interposed between the bare hardware 820 and the OS 810. In this configuration, VMM 830 acts as a software "cushion" or virtualization layer between the OS 810 and the bare hardware 820 of the computer system 700.

VMM 830 instantiates and runs one or more virtual machine instances ("guest machines"). Each guest machine comprises a "guest" operating system, such as OS 810, and one or more applications, such as application(s) 802, designed to execute on the guest operating system. The VMM 830 presents the guest operating systems with a virtual operating platform and manages the execution of the guest operating systems.

In some instances, the VMM 830 may allow a guest operating system to run as if it is running on the bare hardware 820 of computer system 700 directly. In these instances, the same version of the guest operating system configured to execute on the bare hardware 820 directly may also execute on VMM 830 without modification or reconfiguration. In other words, VMM 830 may provide full hardware and CPU virtualization to a guest operating system in some instances.

In other instances, a guest operating system may be specially designed or configured to execute on VMM 830 for efficiency. In these instances, the guest operating system is "aware" that it executes on a virtual machine monitor. In other words, VMM 830 may provide para-virtualization to a guest operating system in some instances.

A computer system process comprises an allotment of hardware processor time, and an allotment of memory (physical and/or virtual), the allotment of memory being for storing instructions executed by the hardware processor, for storing data generated by the hardware processor executing the instructions, and/or for storing the hardware processor state (e.g. content of registers) between allotments of the hardware processor time when the computer system process is not running. Computer system processes run under the control of an operating system, and may run under the control of other programs being executed on the computer system.

The above-described basic computer hardware and software is presented for purposes of illustrating the basic underlying computer components that may be employed for implementing the example embodiment(s). The example embodiment(s), however, are not necessarily limited to any particular computing environment or computing device configuration. Instead, the example embodiment(s) may be implemented in any type of system architecture or processing environment that one skilled in the art, in light of this disclosure, would understand as capable of supporting the features and functions of the example embodiment(s) presented herein.

CLOUD COMPUTING

The term "cloud computing" is generally used herein to describe a computing model which enables on-demand access to a shared pool of computing resources, such as computer networks, servers, software applications, and services, and which allows for rapid provisioning and release of resources with minimal management effort or service provider interaction.

A cloud computing environment (sometimes referred to as a cloud environment, or a cloud) can be implemented in a variety of different ways to best suit different requirements. For example, in a public cloud environment, the underlying computing infrastructure is owned by an organization that makes its cloud services available to other organizations or to the general public. In contrast, a private cloud environment is generally intended solely for use by, or within, a single organization. A community cloud is intended to be shared by several organizations within a community; while a hybrid cloud comprises two or more types of cloud (e.g., private, community, or public) that are bound together by data and application portability.

Generally, a cloud computing model enables some of those responsibilities which previously may have been provided by an organization's own information technology department, to instead be delivered as service layers within a cloud environment, for use by consumers (either within or external to the organization, according to the cloud's public/private nature). Depending on the particular implementation, the precise definition of components or features provided by or within each cloud service layer can vary, but common examples include: Software as a Service (SaaS), in which consumers use software applications that are running upon a cloud infrastructure, while a SaaS provider manages or controls the underlying cloud infrastructure and applications. Platform as a Service (PaaS), in which consumers can use software programming languages and development tools supported by a PaaS provider to develop, deploy, and otherwise control their own applications, while the PaaS provider manages or controls other aspects of the cloud environment (i.e., everything below the run-time execution environment). Infrastructure as a Service (IaaS), in which consumers can deploy and run arbitrary software applications, and/or provision processing, storage, networks, and other fundamental computing resources, while an IaaS provider manages or controls the underlying physical cloud infrastructure (i.e., everything below the operating system layer). Database as a Service (DBaaS) in which consumers use a database server or Database Management System that is running upon a cloud infrastructure, while a DbaaS provider manages or controls the underlying cloud infrastructure, applications, and servers, including one or more database servers.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A computer-executed method comprising:
predicting a size for a buffer pool that is used to cache a set of database objects managed by a database management system, comprising:
identifying each of one or more database objects, of the set of database objects, for optimal buffer pool size prediction analysis based, at least in part, on historical utilization data that comprise a number of requests to read from disk for said each database object,
for each database object, of the one or more identified database objects, determining an object-specific buffer pool size component, wherein determining a particular object-specific buffer pool size component for a particular database object of the one or more identified database objects comprises basing the particular object-specific buffer pool size component on a pre-determined percentage of an on-disk size of the particular database object, wherein the particular database object of the one or more identified database objects comprises one selected from a group consisting of a table column, a tablespace, a materialized view, and an index, and
calculating a predicted size for maximizing a hit rate of the buffer pool based on the one or more object-specific buffer pool size components for the one or more identified database objects; and
adjusting the size of the buffer pool in memory to be the predicted size;
wherein the method is performed by one or more computing devices.

2. The computer-executed method of claim 1, wherein identifying the particular database object comprises:
determining whether a cumulative disk I/O share value exceeds a threshold I/O value;
wherein the cumulative disk I/O share value represents a cumulative percentage of total disk I/O requests in the historical utilization data attributed to any database objects previously identified for optimal buffer pool size prediction analysis;
responsive to determining that the cumulative disk I/O share value does not exceed the threshold I/O value, identifying the particular database object for optimal buffer pool size prediction analysis based on the particular database object having a largest object-specific disk I/O share value among database objects, of the set of database objects, that have not yet been analyzed for optimal buffer pool size prediction;
wherein the object-specific disk I/O share value of the particular database object represents a percentage of the total disk I/O requests in the historical utilization data attributed to the particular database object.

3. The computer-executed method of claim 1, wherein calculating the predicted size for the buffer pool based on the object-specific buffer pool size components for the one or more identified database objects comprises summing the object-specific buffer pool size components for the one or more identified database objects.

4. The computer-executed method of claim 1, wherein determining the particular object-specific buffer pool size component comprises:

using a trained machine learning model to predict a percentage of an on-disk size of the particular database object based, at least in part, on a feature vector comprising one or more of:
   buffer pool utilization during a particular time period,
   a rate of pages not made young per thousand disk reads during the particular time period,
   disk write count per second during the particular time period,
   buffer pool hit rate during the particular time period,
   a current coverage for the particular database object, or
   percentage of the total number of disk I/O requests for the particular database object during the particular time period; and
determining the particular object-specific buffer pool size component based on the predicted percentage of the on-disk size of the particular database object.

5. The computer-executed method of claim 4, wherein the feature vector comprises:
   buffer pool utilization during the particular time period,
   a rate of pages not made young per thousand reads during the particular time period,
   disk write count per second during the particular time period, and
   current coverage for the particular database object.

6. The computer-executed method of claim 1, wherein:
   the buffer pool is allocated for a particular workload that is configured to access the set of database objects;
   the method further comprises, prior to predicting the size for the buffer pool, determining whether the particular workload is in a steady state;
   wherein said predicting the size for the buffer pool is performed in response to determining that the particular workload is in a steady state.

7. The computer-executed method of claim 1, wherein:
   the buffer pool is allocated for a particular workload that is configured to access the set of database objects;
   the set of database objects is a set of active database objects for the particular workload; and
   the historical utilization data further comprises one or more of:
      an amount of space in the buffer pool occupied by each database object of the set of database objects,
      a total size of index and data pages on disk that belong to each database object of the set of database objects, and
      for each database object of the set of database objects,
         a corresponding percentage of a total number of disk I/O requests for the particular workload;
         buffer pool utilization;
         a rate of pages not made young per thousand reads;
         disk write count per second; or
         buffer pool hit rate.

8. The computer-executed method of claim 1, further comprising:
   receiving a request for a buffer pool size prediction for the set of database objects of a database;
   wherein said predicting the size for the buffer pool maintained for the set of database objects is performed in response to receiving the request; and
   returning, as a response to the request, the predicted size for the buffer pool.

9. The computer-executed method of claim 1, further comprising automatically setting the size of the buffer pool to be the predicted size.

10. The computer-executed method of claim 1, wherein determining the particular object-specific buffer pool size component comprises:
   generating a predicted object-specific buffer pool size component;
   determining whether the predicted object-specific buffer pool size component is less than a size of a current allocation of buffer pool memory to the particular database object;
   responsive to determining that the predicted object-specific buffer pool size component is less than the size of the current allocation of buffer pool memory to the particular database object, determining the particular object-specific buffer pool size component to be the size of the current allocation of buffer pool memory to the particular database object.

11. One or more non-transitory computer-readable media storing one or more sequences of instructions that, when executed by one or more processors, cause:
   predicting a size for a buffer pool that is used to cache a set of database objects managed by a database management system, comprising:
      identifying each of one or more database objects, of the set of database objects, for optimal buffer pool size prediction analysis based, at least in part, on historical utilization data that comprise a number of requests to read from disk for said each database object,
      for each database object, of the one or more identified database objects, determining an object-specific buffer pool size component, wherein determining a particular object-specific buffer pool size component for a particular database object of the one or more identified database objects comprises basing the particular object-specific buffer pool size component on a pre-determined percentage of an on-disk size of the particular database object, wherein the particular database object of the one or more identified database objects comprises one selected from a group consisting of a table column, a tablespace, a materialized view, and an index, and
      calculating a predicted size for maximizing a hit rate of the buffer pool based on the one or more object-specific buffer pool size components for the one or more identified database objects; and
   adjusting the size of the buffer pool in memory to be the predicted size.

12. The one or more non-transitory computer-readable media of claim 11, wherein identifying the particular database object of the one or more database objects for optimal buffer pool size prediction analysis comprises:
   determining whether a cumulative disk I/O share value exceeds a threshold I/O value;
   wherein the cumulative disk I/O share value represents a cumulative percentage of total disk I/O requests in the historical utilization data attributed to any database objects previously identified for optimal buffer pool size prediction analysis;
   responsive to determining that the cumulative disk I/O share value does not exceed the threshold I/O value, identifying the particular database object for optimal buffer pool size prediction analysis based on the particular database object having a largest object-specific disk I/O share value among database objects, of the set of database objects, that have not yet been analyzed for optimal buffer pool size prediction;

wherein the object-specific disk I/O share value of the particular database object represents a percentage of the total disk I/O requests in the historical utilization data attributed to the particular database object.

13. The one or more non-transitory computer-readable media of claim 11, wherein calculating the predicted size for the buffer pool based on the object-specific buffer pool size components for the one or more identified database objects comprises summing the object-specific buffer pool size components for the one or more identified database objects.

14. The one or more non-transitory computer-readable media of claim 11, wherein determining the particular object-specific buffer pool size component comprises:
   using a trained machine learning model to predict a percentage of an on-disk size of the particular database object based, at least in part, on a feature vector comprising one or more of:
      buffer pool utilization during a particular time period,
      a rate of pages not made young per thousand disk reads during the particular time period,
      disk write count per second during the particular time period,
      buffer pool hit rate during the particular time period,
      a current coverage for the particular database object, or
      percentage of the total number of disk I/O requests for the particular database object during the particular time period; and
   determining the particular object-specific buffer pool size component based on the predicted percentage of the on-disk size of the particular database object.

15. The one or more non-transitory computer-readable media of claim 14, wherein the feature vector comprises:
   buffer pool utilization during the particular time period,
   a rate of pages not made young per thousand reads during the particular time period,
   disk write count per second during the particular time period, and
   current coverage for the particular database object.

16. The one or more non-transitory computer-readable media of claim 11, wherein:
   the buffer pool is allocated for a particular workload that is configured to access the set of database objects;
   the one or more sequences of instructions further comprise instructions that, when executed by one or more processors, cause, prior to predicting the size for the buffer pool, determining whether the particular workload is in a steady state;
   wherein said predicting the size for the buffer pool is performed in response to determining that the particular workload is in a steady state.

17. The one or more non-transitory computer-readable media of claim 11, wherein:
   the buffer pool is allocated for a particular workload that is configured to access the set of database objects;
   the set of database objects is a set of active database objects for the particular workload; and
   the historical utilization data further comprises one or more of:
      an amount of space in the buffer pool occupied by each database object of the set of database objects,
      a total size of index and data pages on disk that belong to each database object of the set of database objects, and
      for each database object of the set of database objects, a corresponding percentage of a total number of disk I/O requests for the particular workload;
      buffer pool utilization;
      a rate of pages not made young per thousand reads;
      disk write count per second; or
      buffer pool hit rate.

18. The one or more non-transitory computer-readable media of claim 11, wherein the one or more sequences of instructions further comprise instructions that, when executed by one or more processors, cause automatically setting the size of the buffer pool to be the predicted size.

* * * * *

UNITED STATES PATENT AND TRADEMARK OFFICE
CERTIFICATE OF CORRECTION

PATENT NO. : 11,868,261 B2
APPLICATION NO. : 17/381072
DATED : January 9, 2024
INVENTOR(S) : Faizian et al.

Page 1 of 1

It is certified that error appears in the above-identified patent and that said Letters Patent is hereby corrected as shown below:

In the Specification

In Column 11, Lines 9-10, delete ""BP_SIZE=Dcur_object,t1=max(BPcur_object,t1," and insert -- "BP_SIZEcur_object,t1=max(BPcur_object,t1, -- , therefor.

Signed and Sealed this
Fourteenth Day of May, 2024

Katherine Kelly Vidal
*Director of the United States Patent and Trademark Office*